(12) United States Patent
Iida

(10) Patent No.: US 9,674,051 B2
(45) Date of Patent: Jun. 6, 2017

(54) CONTENT MANAGEMENT DEVICE, CONTENT MANAGEMENT METHOD, AND INTEGRATED CIRCUIT

(71) Applicant: Panasonic Intellectual Property Corporation of America, Torrance, CA (US)

(72) Inventor: Shigehiro Iida, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 14/361,186

(22) PCT Filed: Oct. 16, 2013

(86) PCT No.: PCT/JP2013/006150
§ 371 (c)(1),
(2) Date: May 28, 2014

(87) PCT Pub. No.: WO2014/064907
PCT Pub. Date: May 1, 2014

(65) Prior Publication Data
US 2014/0359719 A1 Dec. 4, 2014

(30) Foreign Application Priority Data
Oct. 22, 2012 (JP) .................................. 2012-232932

(51) Int. Cl.
*G06F 7/04* (2006.01)
*G06F 15/14* (2006.01)
(Continued)

(52) U.S. Cl.
CPC ........ *H04L 41/509* (2013.01); *G06F 17/3002* (2013.01); *H04L 41/28* (2013.01)

(58) Field of Classification Search
CPC ................................. G06F 12/00; G06F 12/14
(Continued)

(56) References Cited

U.S. PATENT DOCUMENTS 7,603,434 B2* 10/2009 Svendsen ............. G11B 27/034
704/278
8,042,152 B2* 10/2011 Kimura ................... H04L 63/08
726/2
(Continued)

FOREIGN PATENT DOCUMENTS

JP 2007-129308 5/2007
JP 2008-186272 8/2008
(Continued)

OTHER PUBLICATIONS

International Search Report issued Jan. 21, 2014 in International (PCT) Application No. PCT/JP2013/006150.

*Primary Examiner* — Dede Zecher
*Assistant Examiner* — Dereena Cattungal
(74) *Attorney, Agent, or Firm* — Wenderoth, Lind & Ponack, L.L.P.

(57) ABSTRACT

An address generation section (111) receives an acquisition request including a file name of a target content and a device ID of a device (113) as a place where the target content is stored, from an application execution section (112) that executes a viewing application. Then, the address generation section (111) specifies the current file path and IP address of the target content in content information and device information each managed by a management section (107) on the basis of the received acquisition request, and generates an acquisition address for acquiring the target content from the device (113) on the basis of the specified file path and IP address.

9 Claims, 21 Drawing Sheets

(51) Int. Cl.
*G06F 17/30* (2006.01)
*H04L 12/24* (2006.01)

(58) Field of Classification Search
USPC ............................................. 709/217; 705/5
See application file for complete search history.

(56) References Cited

U.S. PATENT DOCUMENTS

| | | | | |
|---|---|---|---|---|
| 8,369,231 | B2* | 2/2013 | Hirose | H04W 8/245 370/252 |
| 2002/0184457 | A1* | 12/2002 | Yuasa | G11B 27/002 711/161 |
| 2004/0177319 | A1* | 9/2004 | Horn | G06F 17/3002 715/205 |
| 2005/0171913 | A1* | 8/2005 | Kurihara | G06F 21/10 705/51 |
| 2006/0218180 | A1* | 9/2006 | Bodlaender | G06F 17/30067 |
| 2008/0022416 | A1* | 1/2008 | Yamauchi | G06F 21/10 726/31 |
| 2008/0104219 | A1* | 5/2008 | Kageyama et al. | 709/223 |
| 2008/0183719 | A1* | 7/2008 | Kageyama | G06F 17/3089 |
| 2009/0178091 | A1* | 7/2009 | Miyamoto | H04N 7/17336 725/91 |
| 2010/0121911 | A1 | 5/2010 | Sekiguchi et al. | |
| 2010/0332615 | A1* | 12/2010 | Short et al. | 709/217 |
| 2011/0225417 | A1* | 9/2011 | Maharajh | G06F 21/10 713/150 |

FOREIGN PATENT DOCUMENTS

| | | |
|---|---|---|
| JP | 2009-200920 | 9/2009 |
| JP | 2010-103622 | 5/2010 |
| JP | 4677992 | 4/2011 |
| JP | 2011-130040 | 6/2011 |
| WO | 2008/108002 | 9/2008 |

\* cited by examiner

FIG. 9

REGISTERED DEVICE INFORMATION

| DEVICE ID |
|---|
| AD-00-01 |
| AD-01-02 |

FIG. 11

CONTENT INFORMATION OF HDD RECORDER
(BEFORE DUPLICATION)         1101

| FILE NAME | FILE PATH | SPECIFIC INFORMATION |
|---|---|---|
| MOL003.mpg | ¥MOVIE¥20111206¥ | OBJECT OF SHOOTING : TARO <br>GPS : [34.734970,135.663000]<br>SHOOTING DATE : 2011/7/22 10:32 |
| MOL004.mpg | ¥MOVIE¥20111206¥ | OBJECT OF SHOOTING : TARO AND HANAKO<br>GPS : [34.734970,135.663000]<br>SHOOTING TIME : 2011/7/27 21:03 |
| P1000129.jpg | ¥PHOTO¥20120505¥ | OBJECT OF SHOOTING : TARO AND JIRO<br>GPS : [34.734970,135.663000]<br>SHOOTING TIME : 2011/7/30 12:15 |
| P1000132.jpg | ¥PHOTO¥20120505¥ | SHOOTING TIME : 2012/7/3 12:15<br>SHOOTING PERIOD : 17'21 |
| 01_SONG1.mp3 | ¥MUSIC¥ARTISTS¥ ARTIST 1 ¥ | PRODUCTION TIME : 2012/7/8 23:33<br>ARTIST NAME : ARTIST 1<br>ALBUM NAME : ALBUM 1<br>REPRODUCTION TIME : 3'21 |
| 02_SONG2.mp3 | ¥MUSIC¥ARTISTS¥ ARTIST 1 ¥ | PRODUCTION TIME : 2012/7/8 23:34<br>ARTIST NAME : ARTIST 1<br>ALBUM NAME : ALBUM 1<br>REPRODUCTION TIME : 4'16 |
| ⋮ | ⋮ | ⋮ |

FIG. 12

CONTENT INFORMATION OF HDD RECORDER
(AFTER DUPLICATION)

| FILE NAME | FILE PATH | SPECIFIC INFORMATION |
|---|---|---|
| MOL003.mpg | ¥MOVIE¥20111206¥ | OBJECT OF SHOOTING : TARO<br>GPS : [34.734970,135.663000]<br>SHOOTING DATE : 2011/7/22 10:32 |
| MOL004.mpg | ¥MOVIE¥20111206¥ | OBJECT OF SHOOTING : TARO AND HANAKO<br>GPS : [34.734970,135.663000]<br>SHOOTING TIME : 2011/7/27 21:03 |
| P1000129.jpg | ¥PHOTO¥20120505¥ | OBJECT OF SHOOTING : TARO AND JIRO<br>GPS : [34.734970,135.663000]<br>SHOOTING TIME : 2011/7/30 12:15 |
| P1000132.jpg | ¥PHOTO¥20120505¥ | SHOOTING TIME : 2012/7/3 12:15<br>SHOOTING PERIOD : 17'21 |
| 01_SONG1.mp3 | ¥MUSIC¥ARTISTS¥ ARTIST 1 ¥ | PRODUCTION TIME : 2012/7/8 23:33<br>ARTIST NAME : ARTIST 1<br>ALBUM NAME : ALBUM 1<br>REPRODUCTION TIME : 3'21 |
| 02_SONG2.mp3 | ¥MUSIC¥ARTISTS¥ ARTIST 1 ¥ | PRODUCTION TIME : 2012/7/8 23:34<br>ARTIST NAME : ARTIST 1<br>ALBUM NAME : ALBUM 1<br>REPRODUCTION TIME : 4'16 |
| P1020008.jpg | ¥PHOTO¥20120713¥ | OBJECT OF SHOOTING : TARO<br>GPS : [34.734970,135.663000]<br>SHOOTING TIME : 2012/7/17 16:12 |
| ⋮ | ⋮ | ⋮ |

CONTENT INFORMATION OF DIGITAL CAMERA
(BEFORE DUPLICATION)

| FILE NAME | FILE PATH | SPECIFIC INFORMATION |
|---|---|---|
| P1010024.jpg | ¥DCIM¥101_PANA¥ | OBJECT OF SHOOTING : TARO<br>GPS : [34.734970,135.663000]<br>SHOOTING DATE : 2011/7/10 13:01 |
| P1010025.jpg | ¥DCIM¥101_PANA¥ | OBJECT OF SHOOTING : HANAKO<br>GPS : [29.497370,131.009730]<br>SHOOTING TIME : 2011/7/12 11:03 |
| P1010027.jpg | ¥DCIM¥101_PANA¥ | OBJECT OF SHOOTING : TARO AND JIRO<br>GPS : [34.734970,135.663000]<br>SHOOTING TIME : 2011/9/30 9:37 |
| P1020004.mpg | ¥DCIM¥102_PANA¥ | SHOOTING TIME : 2012/7/3 12:15<br>REPRODUCTION TIME : 3'30 |
| P1020007.jpg | ¥DCIM¥102_PANA¥ | OBJECT OF SHOOTING : JIRO<br>GPS : [31.773490,132.644000]<br>SHOOTING TIME : 2012/6/29 10:47 |
| P1020008.jpg | ¥DCIM¥102_PANA¥ | OBJECT OF SHOOTING : TARO<br>GPS : [34.734970,135.663000]<br>SHOOTING TIME : 2012/7/17 16:12 |
| ⋮ | ⋮ | ⋮ |

CONTENT INFORMATION OF DIGITAL CAMERA
(AFTER DUPLICATION)

| FILE NAME | FILE PATH | SPECIFIC INFORMATION |
|---|---|---|
| P1010024.jpg | ¥DCIM¥101_PANA¥ | OBJECT OF SHOOTING : TARO<br>GPS : [34.734970,135.663000]<br>SHOOTING DATE : 2011/7/10 13:01 |
| P1010025.jpg | ¥DCIM¥101_PANA¥ | OBJECT OF SHOOTING : HANAKO<br>GPS : [29.497370,131.009730]<br>SHOOTING TIME : 2011/7/12 11:03 |
| P1010027.jpg | ¥DCIM¥101_PANA¥ | OBJECT OF SHOOTING : TARO AND JIRO<br>GPS : [34.734970,135.663000]<br>SHOOTING TIME : 2011/9/30 9:37 |
| P1020004.mpg | ¥DCIM¥102_PANA¥ | SHOOTING TIME : 2012/7/3 12:15<br>REPRODUCTION TIME : 3˙30 |
| P1020007.jpg | ¥DCIM¥102_PANA¥ | OBJECT OF SHOOTING : JIRO<br>GPS : [31.773490,132.644000]<br>SHOOTING TIME : 2012/6/29 10:47 |
| P1020008.jpg | ¥DCIM¥102_PANA¥ | OBJECT OF SHOOTING : TARO<br>GPS : [34.734970,135.663000]<br>SHOOTING TIME : 2012/7/17 16:12<br>DEVICE TO WHICH CONTENT HAS BEEN DUPLICATED :<br>4D454930-0100-1000-8001-<br>04209AA30243 |
| ⋮ | ⋮ | ⋮ |

DEVICE INFORMATION OF HDD RECORDER

| DEVICE ID | IP ADDRESS | CONNECTION STATE | ALLOCATION PERIOD LOG |
|---|---|---|---|
| 4D454930-0100-1000-8001-04209AA30243 | 192.168.0.3 | ON LINE | 2012/07/7 10:21 ~ 2012/07/10 6:01 |
| | - | OFF LINE | 2012/07/10 6:02 ~ 2012/7/12 20:13 |
| | 192.168.0.3 | ON LINE | 2012/07/10 6:02 ~ 2012/07/11 8:26 |
| | 192.168.0.6 | ON LINE | 2012/07/11 6:02 ~ now |

FIG. 16

DEVICE INFORMATION OF DIGITAL CAMERA

| DEVICE ID | IP ADDRESS | CONNECTION STATE | ALLOCATION PERIOD LOG |
|---|---|---|---|
| KDCCSD30-0100-1000-8000-04209A25A897 | 192.168.0.5 | ON LINE | 2012/07/09 10:21 ~ 2012/07/10 19:20 |
| | 192.168.0.4 | ON LINE | 2012/07/10 19:21 ~ 2012/07/12 9:30 |
| | - | OFF LINE | 2012/07/12 9:30 ~ now |

FIG. 17        CONTENT LIST INFORMATION

| DEVICE ID | FILE NAME | FILE PATH | SPECIFIC INFORMATION |
|---|---|---|---|
| 4D454930-0100-1000-8001-04209AA30243 | MOL003.mpg | ¥MOVIE¥20111206¥ | OBJECT OF SHOOTING : TARO<br>GPS : [34.734970,135.663000]<br>SHOOTING DATE : 2011/7/22 10:32 |
| 4D454930-0100-1000-8001-04209AA30243 | MOL004.mpg | ¥MOVIE¥20111206¥ | OBJECT OF SHOOTING : TARO AND HANAKO<br>GPS : [34.734970,135.663000]<br>SHOOTING TIME : 2011/7/27 21:03 |
| 4D454930-0100-1000-8001-04209AA30243 | P1000129.jpg | ¥PHOTO¥20120505¥ | OBJECT OF SHOOTING : TARO AND JIRO<br>GPS : [34.734970,135.663000]<br>SHOOTING TIME : 2011/7/30 12:15 |
| 4D454930-0100-1000-8001-04209AA30243 | P1000132.jpg | ¥PHOTO¥20120505¥ | SHOOTING TIME : 2012/7/3 12:15<br>SHOOTING PERIOD : 17'21 |
| 4D454930-0100-1000-8001-04209AA30243 | 01_SONG1.mp3 | ¥MUSIC¥ARTISTS¥ARTIST 1¥ | PRODUCTION TIME : 2012/7/8 23:33<br>ARTIST NAME : ARTIST 1<br>ALBUM NAME : ALBUM 1<br>REPRODUCTION TIME : 3'21 |
| 4D454930-0100-1000-8001-04209AA30243 | 02_SONG2.mp3 | ¥MUSIC¥ARTISTS¥ARTIST 1¥ | PRODUCTION TIME : 2012/7/8 23:34<br>ARTIST NAME : ARTIST 1<br>ALBUM NAME : ALBUM 1<br>REPRODUCTION TIME : 4'16 |
| : | : | : | : |
| KDCCSD30-0100-1000-8000-04209A25A897 | P1010024.jpg | ¥DCIM¥101_PANA¥ | OBJECT OF SHOOTING : TARO<br>GPS : [34.734970,135.663000]<br>SHOOTING DATE : 2011/7/10 13:01 |
| KDCCSD30-0100-1000-8000-04209A25A897 | P1010025.jpg | ¥DCIM¥101_PANA¥ | OBJECT OF SHOOTING : HANAKO<br>GPS : [29.497370,131.009730]<br>SHOOTING TIME : 2011/7/12 11:03 |
| KDCCSD30-0100-1000-8000-04209A25A897 | P1010027.jpg | ¥DCIM¥101_PANA¥ | OBJECT OF SHOOTING : TARO AND JIRO<br>GPS : [34.734970,135.663000]<br>SHOOTING TIME : 2011/9/30 9:37 |
| KDCCSD30-0100-1000-8000-04209A25A897 | P1020004.mpg | ¥DCIM¥102_PANA¥ | SHOOTING TIME : 2012/7/3 12:15<br>REPRODUCTION TIME : 3'30 |
| KDCCSD30-0100-1000-8000-04209A25A897 | P1020007.jpg | ¥DCIM¥102_PANA¥ | OBJECT OF SHOOTING : JIRO<br>GPS : [31.773490,132.644000]<br>SHOOTING TIME : 2012/6/29 10:47 |
| KDCCSD30-0100-1000-8000-04209A25A897 | P1020008.jpg | ¥DCIM¥102_PANA¥ | OBJECT OF SHOOTING : TARO<br>GPS : [34.734970,135.663000]<br>SHOOTING TIME : 2012/7/17 16:12 |
| : | : | : | : |

FIG. 18    CONTENT LIST INFORMATION INTEGRATED IN VIEWING APPLICATION

| DOMAIN NAME | FILE NAME | FILE PATH |
|---|---|---|
| 4D454930-0100-1000-8001-04209AA30243 | P1000129.jpg | ¥PHOTO¥20120505¥ ← 1801 |
| KDCCSD30-0100-1000-8000-04209A25A897 | P1010027.jpg | ¥DCIM¥101_PANA¥ ← 1802 |
| www.happyshoping.com | vo093-07701-01m.jpg | /voi/webcatalog/img/vo093/077/ |
| KDCCSD30-0100-1000-8000-04209A25A897 | P1020008.jpg | ¥DCIM¥102_PANA¥ |
| www.happyshoping.com | vo093-07721-02m.jpg | /voi/webcatalog/img/vo093/077/ |
| 4D454930-0100-1000-8001-04209AA30243 | P1000132.jpg | ¥PHOTO¥20120505¥ |
| KDCCSD30-0100-1000-8000-04209A25A897 | P1010025.jpg | ¥DCIM¥101_PANA¥ |
| www.happyshoping.com | vo093-07845-01m.jpg | /voi/webcatalog/img/vo093/078/ |
| www.happyshoping.com | vo093-07877-02m.jpg | /voi/webcatalog/img/vo093/078/ |
| KDCCSD30-0100-1000-8000-04209A25A897 | P1010024.jpg | ¥DCIM¥101_PANA¥ |
| www.happyshoping.com | vo093-07891-02m.jpg | /voi/webcatalog/img/vo093/078/ |

FIG. 19

CONTENT LIST INFORMATION

| IP ADDRESS | COLLECTION TIME | FILE NAME | FILE PATH | SPECIFIC INFORMATION |
|---|---|---|---|---|
| 192.168.0.3 | 2012/07/09 12:12 | MOL003.mpg | ¥MOVIE¥20111206¥ | OBJECT OF SHOOTING : TARO<br>GPS : [34.734970,135.663000]<br>SHOOTING DATE : 2011/7/22 10:32 |
| 192.168.0.3 | 2012/07/09 12:12 | MOL004.mpg | ¥MOVIE¥20111206¥ | OBJECT OF SHOOTING : TARO AND HANAKO<br>GPS : [34.734970,135.663000]<br>SHOOTING TIME : 2011/7/27 21:03 |
| 192.168.0.3 | 2012/07/09 12:13 | P1000129.jpg | ¥PHOTO¥20120505¥ | OBJECT OF SHOOTING : TARO AND JIRO<br>GPS : [34.734970,135.663000]<br>SHOOTING TIME : 2011/7/30 12:15 |
| 192.168.0.3 | 2012/07/09 12:13 | P1000132.jpg | ¥PHOTO¥20120505¥ | SHOOTING TIME : 2012/7/3 12:15<br>SHOOTING PERIOD : 17 '21 |
| 192.168.0.3 | 2012/07/09 12:13 | 01_SONG1.mp3 | ¥MUSIC¥ARTISTS¥ ARTIST 1¥ | PRODUCTION TIME : 2012/7/8 23:33<br>ARTIST NAME : ARTIST 1<br>ALBUM NAME : ALBUM 1<br>REPRODUCTION TIME : 3' 21 |
| 192.168.0.3 | 2012/07/09 12:13 | 02_SONG2.mp3 | ¥MUSIC¥ARTISTS¥ ARTIST 1¥ | PRODUCTION TIME : 2012/7/8 23:34<br>ARTIST NAME : ARTIST 1<br>ALBUM NAME : ALBUM 1<br>REPRODUCTION TIME : 4' 16 |
| : | : | : | : | : |
| 192.168.0.5 | 2012/07/09 12:15 | P1010024.jpg | ¥DCIM¥101_PANA¥ | OBJECT OF SHOOTING : TARO<br>GPS : [34.734970,135.663000]<br>SHOOTING DATE : 2011/7/10 13:01 |
| 192.168.0.5 | 2012/07/09 12:15 | P1010025.jpg | ¥DCIM¥101_PANA¥ | OBJECT OF SHOOTING : HANAKO<br>GPS : [29.497370,131.009730]<br>SHOOTING TIME : 2011/7/12 11:03 |
| 192.168.0.5 | 2012/07/09 12:15 | P1010027.jpg | ¥DCIM¥101_PANA¥ | OBJECT OF SHOOTING : TARO AND JIRO<br>GPS : [34.734970,135.663000]<br>SHOOTING TIME : 2011/9/30 9:37 |
| 192.168.0.5 | 2012/07/09 12:15 | P1020004.mpg | ¥DCIM¥102_PANA¥ | SHOOTING TIME : 2012/7/3 12:15<br>REPRODUCTION TIME : 3' 30 |
| 192.168.0.5 | 2012/07/09 12:15 | P1020007.jpg | ¥DCIM¥102_PANA¥ | OBJECT OF SHOOTING : JIRO<br>GPS : [31.773490,132.644000]<br>SHOOTING TIME : 2012/6/29 10:47 |
| 192.168.0.5 | 2012/07/09 12:15 | P1020008.jpg | ¥DCIM¥102_PANA¥ | OBJECT OF SHOOTING : TARO<br>GPS : [34.734970,135.663000]<br>SHOOTING TIME : 2012/7/17 16:12 |
| : | : | : | : | : |

FIG. 20  CONTENT LIST INFORMATION INTEGRATED IN VIEWING APPLICATION

| DOMAIN NAME | COLLECTION TIME | FILE NAME | FILE PATH |
|---|---|---|---|
| 192.168.0.3 | 2012/07/09/12:13 | P1000129.jpg | ¥PHOTO¥20120505¥ |
| 192.168.0.3 | 2012/07/09/12:15 | P1010027.jpg | ¥DCIM¥101_PANA¥ |
| www.happyshoping.com | 2012/07/09/12:13 | vo093-07701-01m.jpg | /voi/webcatalog/img/vo093/077/ |
| 192.168.0.3 | 2012/07/09/12:15 | P1020008.jpg | ¥DCIM¥102_PANA¥ |
| www.happyshoping.com | 2012/07/09/12:13 | vo093-07721-02m.jpg | /voi/webcatalog/img/vo093/077/ |
| 192.168.0.3 | 2012/07/09/12:13 | P1000132.jpg | ¥PHOTO¥20120505¥ |
| 192.168.0.5 | 2012/07/09/12:15 | P1010025.jpg | ¥DCIM¥101_PANA¥ |
| www.happyshoping.com | 2012/07/09/12:13 | vo093-07845-01m.jpg | /voi/webcatalog/img/vo093/078/ |
| www.happyshoping.com | 2012/07/09/12:13 | vo093-07877-02m.jpg | /voi/webcatalog/img/vo093/078/ |
| 192.168.0.5 | 2012/07/09/12:15 | P1010024.jpg | ¥DCIM¥101_PANA¥ |
| www.happyshoping.com | 2012/07/09/12:13 | vo093-07891-02m.jpg | /voi/webcatalog/img/vo093/078/ |

~2001

CONTENT MANAGEMENT DEVICE, CONTENT MANAGEMENT METHOD, AND INTEGRATED CIRCUIT

TECHNICAL FIELD

The present invention relates to a technique which generates an address for acquiring a content from a device.

BACKGROUND ART

In recent years, the prevalence of a recorder capable of simultaneously recording a plurality of programs, a television set with a recording function, a smart phone, a digital camera, a digital video camera, and the like has significantly increased the number of contents held in devices at home, such as a photograph, a moving picture, and a recorded program.

Against this background, a technique has been known which causes a server provided on a network to store and manage contents at home. For example, Patent Document 1 discloses a technique which includes a content management DB that manages information about the whereabouts of a content stored in a delivery server, acquires, upon receipt of the content ID of a content desired to be viewed from a viewer client, the whereabouts information of the content desired to be viewed from the content management DB, and notifies the viewer client of the whereabouts information.

Patent Document 1 also discloses that a control information storage section is caused to store the whereabouts information managed by the content management DB and, when trouble occurs in the content management DB and the acquisition of the whereabouts information of the content desired to be viewed fails, the whereabouts information of the corresponding content is acquired from the control information storage section and given to the viewer client.

However, in the method of Patent Document 1, the contents are collectively stored in the delivery server and no consideration is given to a change in the place where each of the contents has been stored. This leads to the problem that, when the place where a content desired to be viewed has been stored is changed, the real storage place of the content cannot be specified and the content cannot be viewed.

Patent Document 1: Japanese Patent No. 4677992

SUMMARY OF THE INVENTION

An object of the present invention is to provide a technique which specifies, even when the place where a content has been stored is changed, the real storage place of the content and enables the content to be viewed.

A content management device according to an aspect of the present invention includes a content information collection section that collects content information in which a content identifier of a content held in a device connected thereto via a network is associated with storage place information showing a place where the content is stored, a device information collection section that detects a change in a state of the device and collects, from the device, device information in which a device identifier of the device is associated with a communication identifier, a management section that manages the content information and the device information, a content information update section that detects an operation on the content in the device and records, in the content information, the storage place information of the content the storage place of which has been changed by the operation in association with the content identifier, a transmission section that generates, on the basis of the content information, content list information in which the content identifier and the storage place information are associated with device specification information for specifying the device storing therein the content, and transmits the generated content list information to an application generation device, and an address generation section that specifies, upon receipt of an acquisition request including the content identifier of a target content and the device specification information of the device as the storage place from a viewing application for viewing the content generated by the application generation device on the basis of the content list information, current storage place information of the target content and the communication identifier thereof in the content information and the device information on the basis of the acquisition request and generates an acquisition address for acquiring the target content from the device on the basis of the specified storage place information and communication identifier.

BRIEF DESCRIPTION OF THE DRAWINGS

FIG. 9 is a view showing an example of a data configuration of registered device information.

FIG. 11 is a view showing an example of a data configuration of the content information of an HDD recorder.

FIG. 12 is a view showing an example of the data configuration of the content information after a content having a file name "P102008.jpg" in the content information in FIG. 11 was duplicated from a digital camera to the HDD recorder.

FIG. 13 is a view showing an example of the data configuration of the content information of the digital camera.

FIG. 14 is a view showing an example of the data configuration of the content information after the content having the file name "P102008.jpg" in the content information in FIG. 13 is duplicated from the digital camera to the HDD recorder.

FIG. 15 is a view showing an example of a data configuration of the device information of the HDD recorder.

FIG. 16 is a view showing an example of a data configuration of the device information of the digital camera.

FIG. 17 is a view showing an example of a data configuration of content list information.

FIG. 18 is a view showing an example of a data configuration of the content list information integrated in a viewing application.

FIG. 19 is a view showing an example of the data configuration of content list information in Embodiment 2.

FIG. 20 is a view showing an example of the data configuration of the content list information integrated in a viewing application in Embodiment 2.

DESCRIPTION OF EMBODIMENTS (Background Leading to Content Management Device According to Embodiment of Present Invention)

In recent years, an enormous number of at-home contents are stored in devices at home. As a result, a problem arises in that, even when a target content to be viewed is to be retrieved using a viewing application for viewing a content, the retrieval requires considerable time. This may lead to a situation in which a user loses interest in viewing the content and the content is left unviewed.

To avoid such a situation, a content viewing system has been proposed in which, on the basis of the behavior history of a user such as the user's history of viewing contents on the Web or the user's history of operating an at-home device, a Web content in which the user is interested is extracted from among the at-home contents stored in the at-home device, the at-home content related to the extracted Web content is extracted, and a viewing application in which information such as the places where the extracted Web content and at-home content are stored is stated is generated and downloaded to the information processing terminal possessed by the user.

In the content viewing system, the Web content in which the user is interested and the at-home content are loaded together and shown to the user. This can enhance the user's interest in viewing the contents and provide a comfortable content viewing environment to the user.

However, the place where the at-home content has been stored is frequently changed by an operation by the user in such a manner that, e.g., a photographic content stored in a digital camera is moved to a recorder.

As a result, the storage place of the at-home content stated in the viewing application may not correspond to the current storage place of the at-home content. In this case, the viewing application cannot obtain the at-home content and the user cannot view the at-home content.

Accordingly, in the present embodiment, a content management device is provided which can notify the viewing application of the real storage place of the at-home content even when the storage place of the at-home content stated in the viewing application does not correspond to the real storage place thereof. A specific description will be given below of the content management device of the present embodiment.

Embodiment 1

Figure 10:
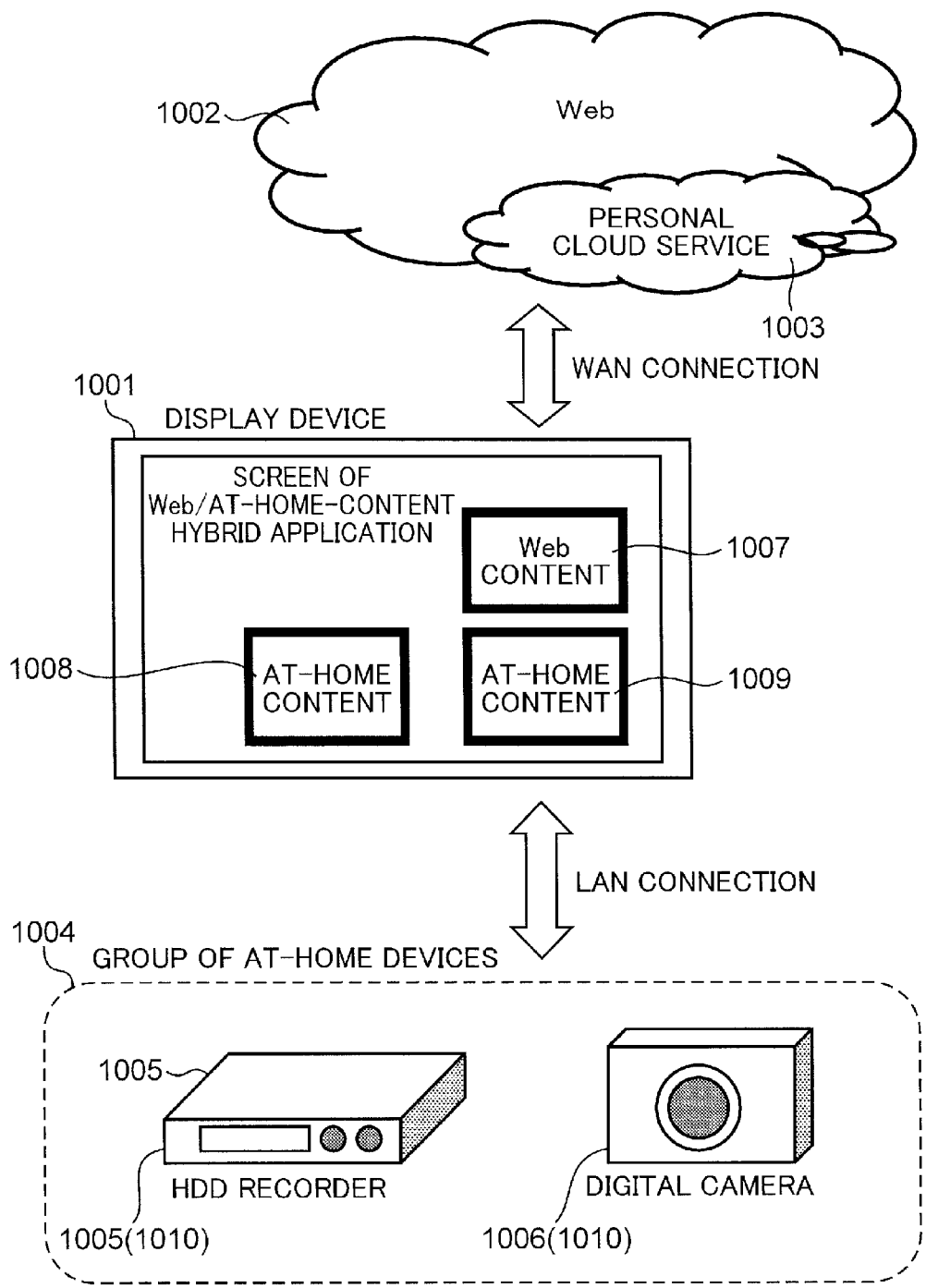
FIG. 10 is a view showing the outline of a content viewing system to which the content management device according to Embodiment 1 of the present invention is applied.

FIG. 10 is a view showing the outline of a content viewing system to which a content management device according to Embodiment 1 is applied. The content management system includes a display device 1001, a personal cloud service 1003, and a group of at-home devices 1004. The content management device is included in the display device 1001.

However, this outline is only illustrative. The content management device may be included in any at-home device including the communication functions of a WAN (Wide Area Network) and a LAN (Local Area Network) and may also be included in an HDD (Hard disk drive) recorder 1005 or a digital camera 1006. Alternatively, the content management device may also be included in a home server which manages the at-home devices.

The display device 1001 is connected to the group of at-home devices 1004 via the LAN and connected to the personal cloud service 1003 present on a Web 1002 via the WAN.

The group of at-home devices 1004 include devices 1010 placed at home. In the example of FIG. 10, as examples of the devices 1010, the HDD recorder 1005 and the digital camera 1006 are shown, but these are illustrative. A digital home appliance such as a Blu-ray recorder, a television set, or a personal computer may also be used or a home appliance such as a washing machine, a rice cooker, an electronic oven, or a refrigerator may also be used.

As the LAN, a wireless LAN or a wired LAN may be used or a network which is a combination of a wireless LAN and a wired LAN may also be used. In the LAN, using a protocol such as, e.g., TCP/IP, DLNA (Digital Living Network Alliance), or UPnP (Universal Plug and Play), various data is transmitted/received.

As the WAN, e.g., the Internet is used and various data is transmitted/received using a protocol such as TCP/IP. The Web 1002 is formed of an Internet communication network and downloads various information to the display device 1001. Note that each of the LAN and the WAN corresponds to an example of a network.

The display device 1001 is formed of an information processing terminal such as, e.g., a smart phone or a tablet terminal and executes a viewing application for viewing a content. The display device 1001 collects information related to the storage places of at-home contents stored in the device 1010 and manages the at-home contents.

The display device 1001 uploads a list of the at-home contents managed thereby to the personal cloud service 1003 via the WAN.

The personal cloud service 1003 extracts, from the Web 1002, the Web content in which the user is interested on the basis of the viewing history of the Web contents viewed by the user using the display device 1001, generates a viewing application in which a list of the extracted Web content and the at-home contents related to the extracted Web content is integrated, and downloads the viewing application to the display device 1001.

The display device 1001 activates the downloaded viewing application and displays at-home contents 1008 and 1009 in which the user is interested among the at-home contents stored in the device 1010 as well as the Web content 1007 in which the user is interested. In FIG. 10, the at-home contents 1008 and 1009 are the at-home contents each related to the Web content in which the user is interested among the at-home contents stored in the HDD recorder 1005 and the digital camera 1006.

Here, even when the place where any of the at-home contents has been stored is changed, the display device 1001 does not necessarily upload information related to the change to the personal cloud service 1003. In this case, the viewing application cannot display the at-home content since the viewing application does not know the real storage place of the at-home content the storage place of which has been changed. To prevent such a situation, the present content management device implements a mechanism which notifies the viewing application of the real storage place of the at-home content even when the viewing application does not know the real storage place thereof.

Figure 1:
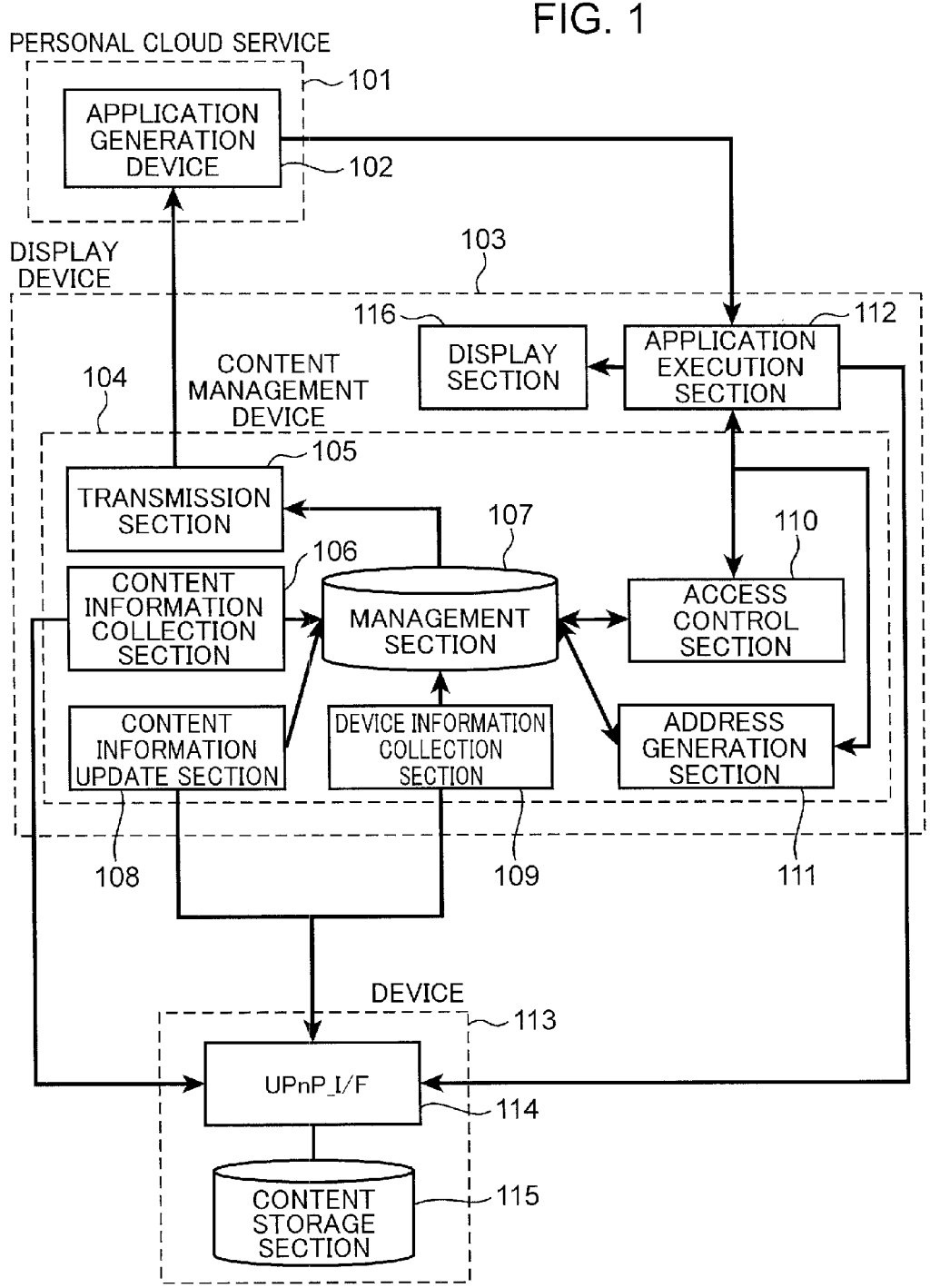
FIG. 1 is a view showing an example of the overall configuration of a content management system to which a content management device in an embodiment of the present invention is applied.

FIG. 1 is a view showing an example of the overall configuration of the content management system to which the content management device is applied in the present embodiment. The content management system includes a personal cloud service 101, a display device 103, and a device 113. The personal cloud service 101 and the display device 103 respectively correspond to the personal cloud service 1003 and the display device 1001 each shown in FIG. 10. The device 113 corresponds to any of the devices 1010 such as the HDD recorder 1005 and the digital camera 1006 each shown in FIG. 10.

The personal cloud service 101 includes an application generation device 102. The application generation device 102 is formed of, e.g., a Web server and generates a viewing application on the basis of the content list information uploaded from the display device 103, which is shown in FIG. 17.

Here, the application generation device 102 extracts the Web content in which the user is interested from the Web. The application generation device 102 also extracts the at-home contents related to the Web content from the content list information of the at-home contents transmitted from a transmission section 105. Then, the application generation device 102 generates the viewing application in which the content list information of the extracted Web content and the at-home contents is integrated.

Here, the application generation device 102 may appropriately extract the Web content in which the user is interested using the viewing history of the Web contents downloaded by the user from the Web to the display device 103.

Examples of the extraction of the at-home contents include a method which extracts the at-home content stored on the same day when the Web content in which the user is interested is posted and a method which extracts a content having a content name similar to the word included in the Web content in which the user is interested. Note that the viewing application is described in, e.g., HTML (HyperText Markup Language), Javascript (registered trademark), XML (Extensive Markup Language), or the like. Examples of the extraction of the Web content in which the user is interested include a method which extracts the Web content that had been viewed by the user a threshold number of times or more in a previous given period.

The display device 103 includes an application execution section 112, a content management device 104, and a display section 116.

The application execution section 112 is implemented by the execution of software such as, e.g., an HTML browser by a CPU. The application execution section 112 acquires the viewing application generated by the application generation device 102 and executes the viewing application. The application execution section 112 also acquires the at-home contents from the device 113 using the acquisition addresses of the contents given thereto from an address generation section 111. The application execution section 112 also displays the result of executing the viewing application on the display section 116.

The content management device 104 includes the transmission section 105, a content information collection section 106, a management section 107, a content information update section 108, a device information collection section 109, an access control section 110, and the address generation section 111.

The content information collection section 106 collects, from the device 113, content information in which each of the file names (an example of a content identifier) of the contents held in the device 113 connected thereto via the LAN is associated with a file path (an example of storage place information) showing the storage place of the content and stores the content information in the management section 107. Details of the content information will be described later.

The device information collection section 109 detects a change in the state of the device 113 and collects, from the device 113, device information in which the device ID (an example of a device identifier) of the device 113 is associated with an IP address (an example of a communication identifier). Examples of the state change include the case where the device 113 has shifted from an off-line state where the device 113 is not connected to the LAN to an on-line state where the device 113 is connected to the LAN and the case opposite thereto.

The device information collection section 109 registers, in the device information, an allocation period log in which the device ID is associated with a period during which the IP address is allocated to the device 113.

The transmission section 105 generates the content list information in which the file names and the file paths are associated with the device IDs (an example of device specification information) of the devices 113 storing therein the contents on the basis of the content information stored in the management section 107 and transmits (uploads) the generated content list information to the application generation device 102.

Here, the transmission section 105 may appropriately generate the content list information from, e.g., the content information stored in the management section 107 using the CDS (Content Directory Service) in the UPnP.

The management section 107 manages the content information shown in FIGS. 11 and 12, the device information shown in FIGS. 15 and 16, and the registered device information shown in FIG. 9. Details of the information managed by the management section 107 will be described later.

As each of the device IDs, e.g., a UDN (Unique Device Name) defined in the UPnP is used. The UPnP is a home network protocol which causes all the devices connected to the Internet to recognize each other and allows even devices present in physically different networks to be seamlessly connected to each other.

The content information update section 108 detects an operation on any of the contents in the device 113, associates the file path of the content that has been changed by the operation with the file name, and records the file path and the file name in the content information. Examples of the operation on the content include addition, duplication, movement, and deletion.

The address generation section 111 receives an acquisition request including the file name of a target content and the device ID of the device 113 as the storage place thereof from the application execution section 112 that executes the viewing application. Then, the address generation section 111 specifies the current file path and IP address of the target content in the content information and the device information each managed by the management section 107 on the basis of the received acquisition request and generates an acquisition address for acquiring the target content from the device 113 on the basis of the specified file path and IP address.

Specifically, the address generation section 111 references all the content information items managed by the management section 107 using the file name included in the acquisition request as a key and specifies the current file path of the target content. The address generation section 111 also references all the device information items managed by the management section 107 using the device ID included in the acquisition request as a key and acquires the current IP address of the device 113 storing therein the target content.

The acquisition address is formed by combining, e.g., a file name, a file path, and an IP address with each other. The file name and the file path form a URL. Accordingly, the acquisition address is formed by combining the URL with the IP address.

Upon receipt of an authentication request from the viewing application prior to access to the content, the access control section 110 determines whether or not the device which executes the viewing application corresponds to the preliminarily registered device which is permitted to access the content. When determining that the device which executes the viewing application corresponds to the preliminarily registered device, the access control section 110 gives an access permission notification to the viewing application.

In the present embodiment, the application execution section 112 that executes the viewing application is provided in the display device 103. Accordingly, when the device ID of the display device 103 has been registered in the registered device information shown in FIG. 9, the access control section 110 gives the access permission notification to the viewing application.

The device 113 includes an UPnP_interface (I/F) 114 and a content storage section 115. The UPnP_I/F 114 is a software module which provides connection between each of a personal computer, a peripheral device of the personal computer, an AV device, a phone, a home appliance, or the like and the device 113 via the LAN and causes each of the personal computer, the peripheral device of the personal computer, the AV device, the phone, the home appliance, or the like and the device 113 to provide the functions thereof to each other according to a UPnP protocol. The content storage section 115 stores contents.

In FIG. 1, the access control section 110 and the address generation section 111 are each implemented by, e.g., causing the CPU to execute a program recorded in a storage device (not shown) such as a hard disk or a memory. The transmission section 105, the content information collection section 106, the content info nation update section 108, the device information collection section 109, and the application execution section 112 are each formed of, e.g., a communication device (not shown) and a storage device (not shown) storing therein a program for controlling the communication device and implemented by causing the CPU to execute the program for controlling the communication device. The management section 107 and the content storage section 115 are each formed of, e.g., a storage device (not shown) such as a hard disk or a memory and implemented through the execution of a program for managing the storage device by the CPU. The display section 116 is formed of a display device such as a touch panel.

Note that a program for implementing each of the blocks provided in the content management device 104 is recorded as a content management program on a computer readable recording medium and provided to the user. Alternatively, the content management program may also be downloaded from a download server provided on the Internet and provided to the user.

Also, in FIG. 1, of the blocks provided in the content management device 104, the transmission section 105, the content information collection section 106, the content information update section 108, the device information collection section 109, the access control section 110, and the address generation section 111 may also be formed of dedicated hardware circuits. In this case, these blocks may also be formed of an integrated circuit in one chip. In this case, the application execution section 112 may also be included in the integrated circuit.

Figure 2:
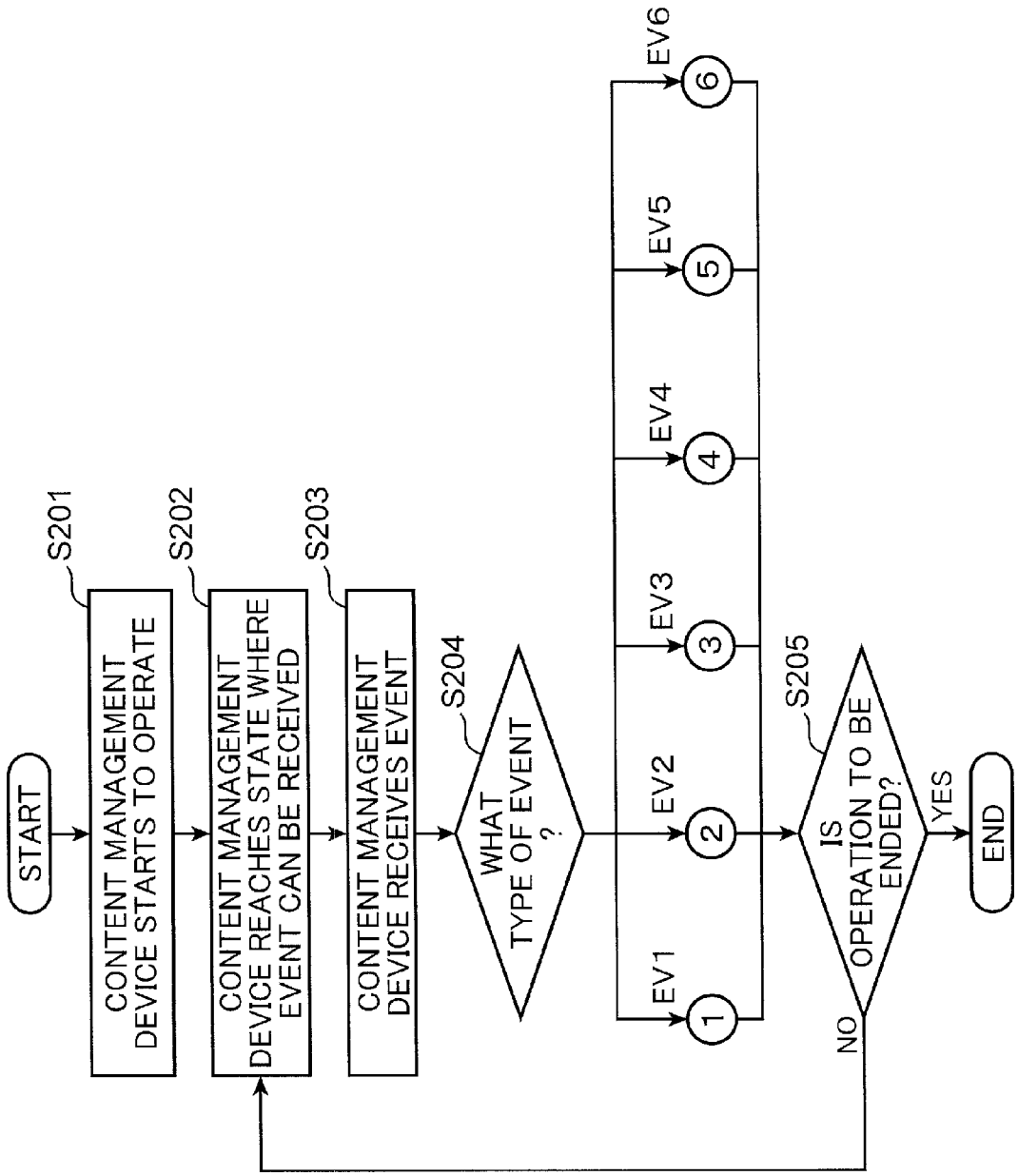
FIG. 2 is a flow chart of a main routine in the content management device in Embodiment 1 of the present invention.

FIG. 2 is a flow chart of a main routine in the content management device in Embodiment 1. First, the power source of the display device 103 is turned ON and the content management device 104 starts to operate (S201). This brings each of the blocks forming the display device 103 into an operable state.

Next, the content management device 104 reaches a state where various events can be received (S202). Note that, in the present embodiment, as the events received by the content management device 104, there are six types of events which are a content information collection event EV1, a device registration event EV2, an access authentication event EV3, an acquisition address solution event EV4, a device tracking event EV5, and a content tracking event EV6.

The content information collection event EV1 is an event issued by the content management device 104 with the lapse of each given time when, e.g., the content management device 104 is connected first to the LAN or when the device 113 is newly connected in the same LAN. In the content information collection event EV1, Process 1 is executed. Details of Process 1 will be described later using FIG. 3.

The device registration event EV2 is an event issued by the application execution section 112 when the application execution section 112 has received an operation for preliminarily registering a device permitted to view the content from the user, and Process 2 is executed therein. Process 2 will be described later using FIG. 4.

The access authentication event EV3 is an event issued when, e.g., the application execution section 112 starts the viewing application, and Process 3 is executed therein. Process 3 will be described later using FIG. 5.

The acquisition address solution event EV4 is an event issued by the content management device 104 when the application execution section 112 permitted to access the content by the access authentication event EV3 gives a request to acquire a content and the address generation section 111 receives the acquisition request, and Process 4 is executed therein. Process 4 will be described later using FIG. 6.

The device tracking event EV5 is an event issued by the content management device 104 when the device information collection section 109 has detected a change in the state of the device 113, and Process 5 is executed therein. Process 5 will be described later using FIG. 7.

The content tracking event EV6 is an event issued by the content management device 104 when an operation is performed on the content in the device 113 and the content information update section 108 has detected the operation, and Process 6 is executed therein. Process 6 will be described later using FIG. 8.

Back to FIG. 2, upon receipt of any of the events (S203), the content management device 104 determines the type of the received event (S204) and performs any of Processes 1 to 6 depending on the type of the event.

Then, when the power source of the display device 103 is turned OFF (YES in S205), the content management device 104 ends the operation. On the other hand, when the power source of the display device 103 is not turned OFF (NO in S205), the process is returned to 202 and continued.

Figure 3:
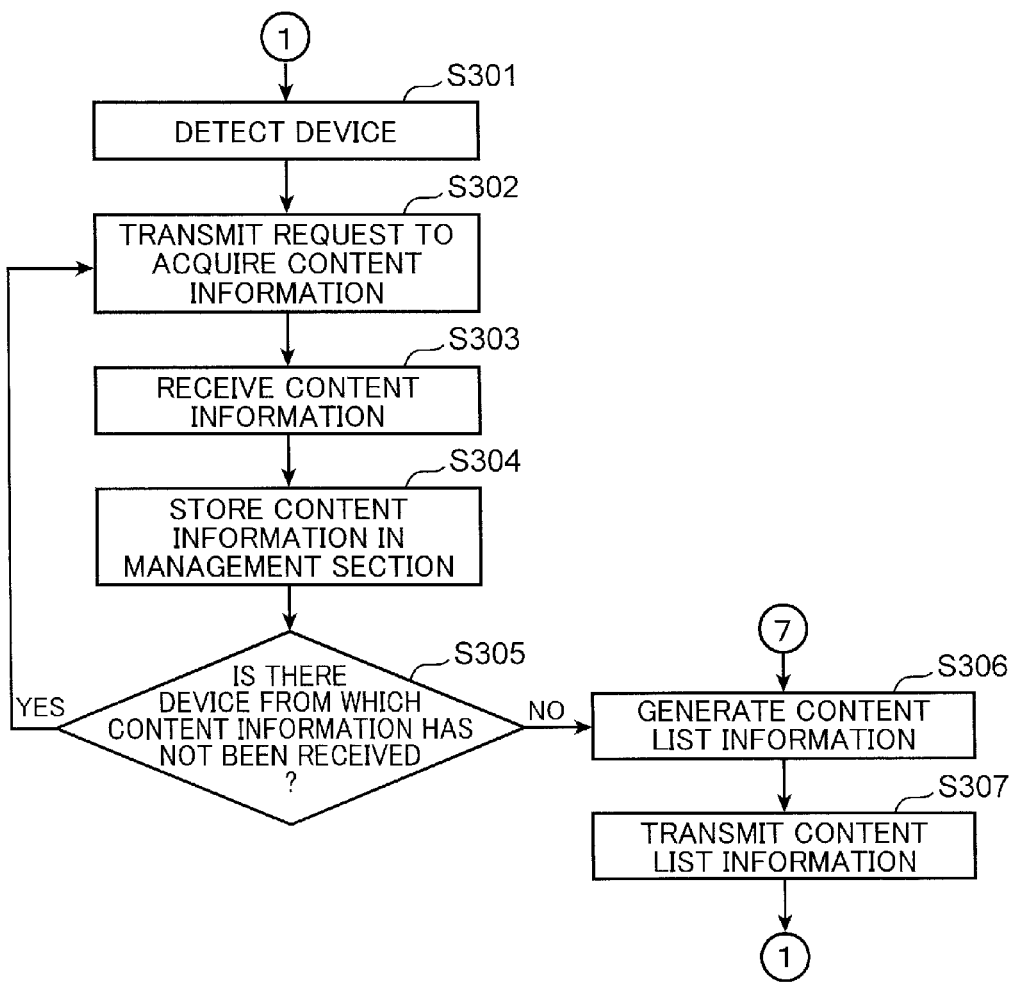
FIG. 3 is a flow chart of Process 1 shown in FIG. 2.

FIG. 3 is a flow chart of Process 1 shown in FIG. 2. The process in S301 to S305 is the process executed by the content information collection section 106 and the process in S306 and 307 is the process executed by the transmission section 105.

First, the content information collection section 106 retrieves and detects the device 113 connected to the display device 103 in the same LAN (S301). Here, the content information collection section 106 may appropriately retrieve the device 113 using a device retrieval protocol such as, e.g., the SSDP (Simple Service Discovery Protocol) of the UPnP (Universal Plug and Play).

Then, the content information collection section 106 transmits, to the device 113 detected in S301, an acquisition request for acquiring content information which is list information of the storage places of the contents held in the device 113 and the like (S302). The device 113 receives the acquisition request via the UPnP_I/F 114, generates the content information related to the contents stored therein, and returns the generated content information to the content information collection section 106.

Then, the content information collection section 106 receives the content information returned from the device 113 (S303).

Then, the content information collection section 106 stores the acquired content information in the management section 107 (S304).

FIG. 11 is a view showing an example of a data configuration of the content information of the HDD recorder 1005. The content information is formed of a relational base in which one record is allocated to one content and file names, file paths, and specific information items have been registered in associated relation. Each of the file names shows the name of the corresponding content. As the content name, a name which allows each of the contents stored in the device 113 to be uniquely identified is used. Note that, in the present embodiment, the content name is used, but the file name is not limited thereto. Any data may be used as long as the data allows the content to be uniquely identified. For example, a symbol string uniquely imparted to the content may also be used.

Each of the file paths shows the storage place of the content in the device 113. In the present embodiment, as the file path, a tree structure representing the path from a root directory to a nearest directory storing therein the content is used.

The specific information is the meta-information of a content. In the specific information, object-of-shooting information imparted by a digital camera or the like to the content through individual recognition when the content is a photographic content, GPS information, shooting time information, and the like are included. Also in the specific information, information such as a reproduction period is included when the content is a moving picture content and an artist name, an album name, and the like are included when the content is a music content.

FIG. 13 is a view showing an example of the data configuration of the content information of the digital camera 1006. Details of the data configuration are the same as in FIG. 11 so that a description thereof is omitted.

Back to FIG. 3, the content information collection section 106 determines whether or not there is the device 113 from which the content information has not been received among the devices 113 detected in S301 (S305). When there is the device 113 from which the content information has not been received (YES in S305), the process is returned to S302 where a request to acquire the content information is transmitted to the device 113 from which the content information has not been received. On the other hand, when there is no device 113 from which the content information has not been received (NO in S305), i.e., when the content information has been received from all the detected devices 113, the content information collection section 106 advances the process to S306.

Then, the transmission section 105 consolidates the content information items of all the devices 113 stored in the management section 107 to generate the content list information (S306) and transmits the content list information to the personal cloud service 101 (S307).

FIG. 17 is a view showing an example of a data configuration of the content list information. The content list information is formed of a relational database in which one record is allocated to one content and the device IDs, the file names, the file paths, and the specific information items have been registered in associated relation. Each of the device IDs is the device ID of the device 113 storing therein the corresponding content. The file names, the file paths, and the specific information items are the same as those described using FIG. 11. That is, the transmission section 105 consolidates the content information items of all the devices stored in the management section 107 into one to generate the content list information by associating each of the contents with the device ID of the device storing therein the content.

It is assumed herein that, in the content information shown in FIG. 11 or the like, the content is associated with the device ID of the device 113 storing therein the content. This allows the transmission section 105 to specify the device ID of each of the contents from the device ID and write the device ID in the content list information.

Figure 4:
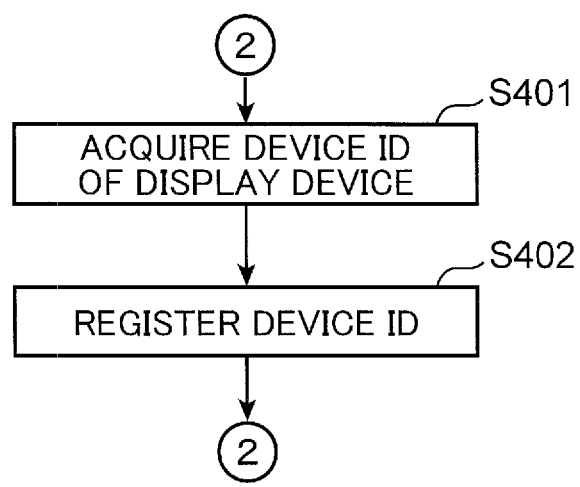
FIG. 4 is a flow chart of Process 2 shown in FIG. 2.

FIG. 4 is a flow chart of Process 2 shown in FIG. 2. Note that S401 and S402 are executed by the access control section 110.

First, the access control section 110 acquires the device ID of the display device 103 (S401). In the present embodiment, the application execution section 112 is mounted in the display device 103 so that the access control section 110 acquires the device ID of the display device 103. Here, the access control section 110 may acquire the device ID by causing the user to input the device ID of the display device 103 thereto or acquire the device ID from a memory the illustration of which is omitted when the device ID of the display device 103 is stored in the memory.

Note that, when the application execution section 112 is mounted in another device (e.g., the HDD recorder 1005 or the digital camera 1006 as the device 113 connected to the same LAN or another display device 103 connected to the same LAN) other than the display device 103, the access control section 110 may appropriately acquire the device ID of the corresponding device.

Next, the access control section 110 registers the acquired device ID in the registered device information shown in FIG. 9 and stores the registered device information in the management section 107 (S402). Thus, Process 2 is ended and the process is advanced to Processes subsequent to Process 2 in FIG. 2.

FIG. 9 is a view showing an example of a data configuration of the registered device information. In the registered device information, the device IDs of the devices each permitted to have an access right are registered. In the example of FIG. 9, the device IDs of two devices are registered. Accordingly, when a request to authenticate the access right is given from the application execution section 112 of either of these devices, the access control section 110 permits access. That is, each of the devices having the device IDs registered in the registered device information is allowed to view the at-home contents.

Figure 5:
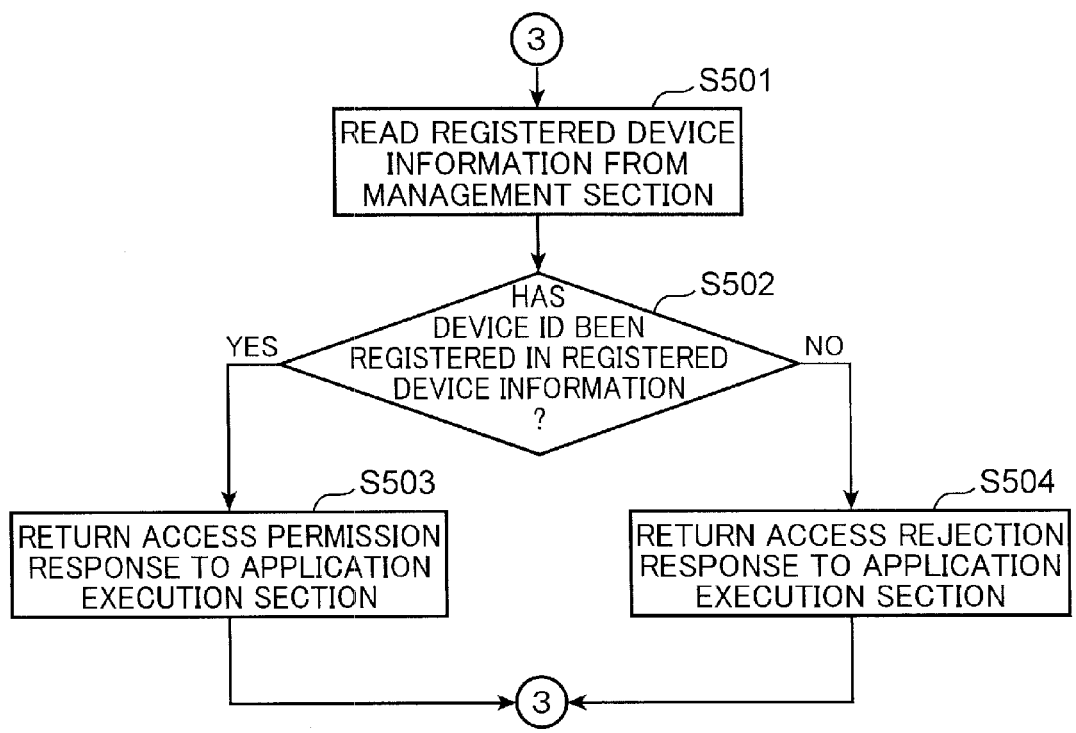
FIG. 5 is a flow chart of Process 3 shown in FIG. 2.

FIG. 5 is a flow chart of Process 3 shown in FIG. 2. The process in S501 to S504 is executed by the access control section 110.

First, when the access authentication event EV3 is issued, the access control section 110 reads the registered device information from the management section 107 (S501). In the authentication request, the device ID of the device in which the application execution section 112 is mounted is included.

Then, the access control section 110 determines whether or not the device ID included in the authentication request has been registered in the registered device information (S502). Then, when the device ID has been registered in the registered device information (YES in S502), the access control section 110 determines that the corresponding device has the access right and gives a response which authorizes the access right to the application execution section 112 (S503). On the other hand, when the device ID is not registered in the registered device information (NO in S502), the access control section 110 determines that the corresponding device does not have the access right and gives a response which denies the access right to the application execution section 112 (S504). Thus, Process 3 is ended and the process is advanced to Processes subsequent to Process 3 in FIG. 2.

Figure 6:
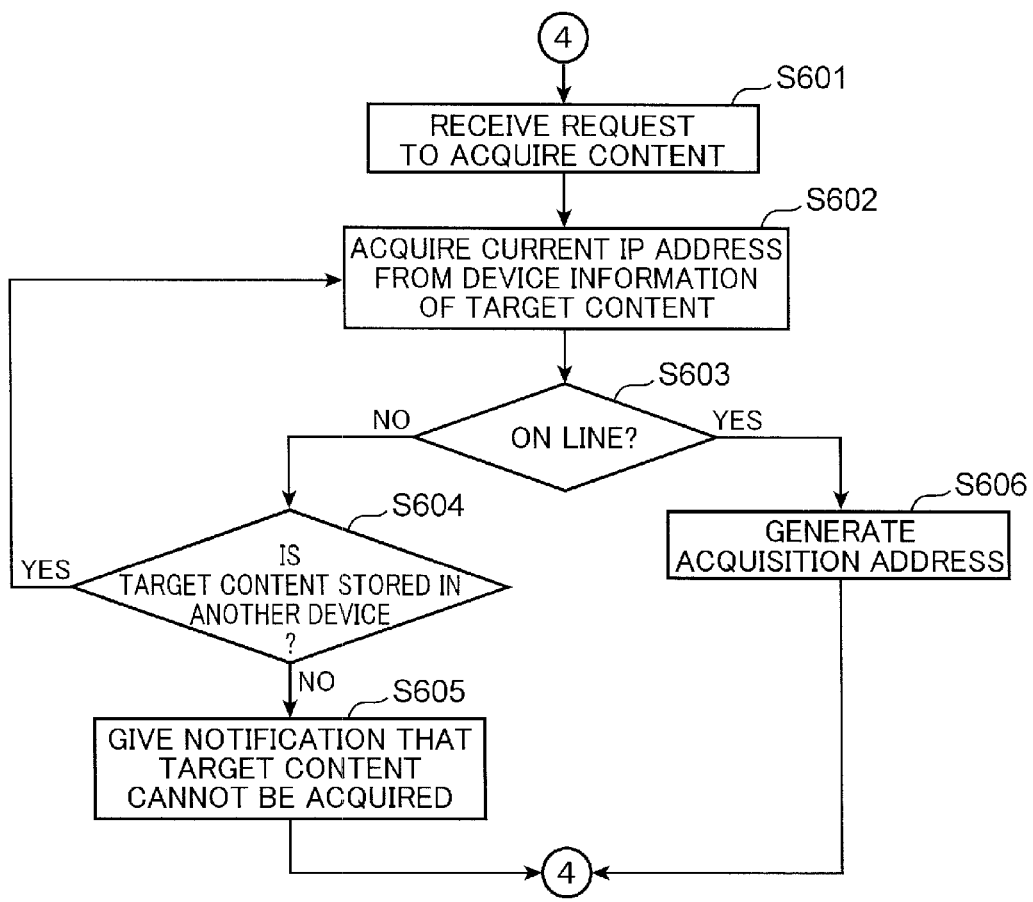
FIG. 6 is a flow chart of Process 4 shown in FIG. 2.

FIG. 6 is a flow chart of Process 4 shown in FIG. 2. The process in S601 to S606 is executed by the address generation section 111. Process 4 is started by the issuing of the acquisition address solution event EV4 which is an acquisition request for acquiring the content registered in the viewing application by the application execution section 112.

The acquisition request is transmitted by the application execution section 112 having the access right authenticated by the access control section 110.

FIG. 18 is a view showing an example of the data configuration of the content list information integrated in the viewing application. In FIG. 18, the content list information is formed of a relational database in which one record is allocated to one content and the domain names, the file names, and the file paths have been registered in associated relation. Each of the domain names shows the domain name of the storage place of the content. For example, when the content is an at-home content, the device ID of the device 113 storing therein the at-home content is used and, when the content is a Web content, the domain name of the Web content is used. The file names and the file paths are the same as described in FIG. 11 and the like.

The content list information shown in FIG. 18 is integrated in the viewing application generated by the application generation device 102 and includes the contents related to the Web content in which the user is interested which have been extracted from among the contents included in the content list information shown in FIG. 17. For example, the content registered in a record 1801 is an at-home content so that, in the space of the domain name, "4D454930-0100-1000-8001-04209AA30243" which is the device ID of the device 113 storing therein the at-home content has been registered. The content registered in a record 1802 is a Web content so that, in the space of the domain, "www.happy-shoping.com" which is the domain name of the Web content has been registered.

First, in S601 shown in FIG. 6, the address generation section 111 receives a request to acquire the target content (S601). Here, in the acquisition request, the domain name of the target content, the file name thereof, and the file path thereof are included. Note that the application execution section 112 may transmit a request or requests to acquire one or a plurality of contents specified by the user in the content list information shown in FIG. 18 by operating the operating section (the illustration thereof is omitted) or simultaneously transmit requests to acquire all the contents included in the content list information shown in FIG. 18. Hereinafter the content to which an acquisition request is transmitted is referred to as a target content. In the following flow chart, a description will be given using the case where the target content is an at-home content as an example.

Then, the address generation section 111 acquires the current IP address from the one of the device information items stored in the management section 107 in which the same device ID as the device ID shown by the domain name included in the acquisition request is registered (S602).

FIG. 15 is a view showing an example of a data configuration of the device information of the HDD recorder 1005. FIG. 16 is a view showing an example of a data configuration of the device information of the digital camera 1006.

As shown in FIGS. 15 and 16, one device information item exists for one device 113. The device information item has a data configuration in which one record is allocated to one allocation period log, and the IP address, the connection state, and the allocation period log have been registered in associated relation therein.

In the space of the IP address, the IP address allocated to the device 113 in the corresponding allocation period log has been registered. The connection state shows whether or not the device 113 was connected to the LAN in the corresponding allocation period log. When the device 113 was connected to the LAN, "On Line" is registered in the space of the connection state and, when the device 113 was not connected to the LAN, "Off Line" is registered in the state of the connection state. The allocation period log shows the period during which the IP address was allocated to the device 113. Note that the allocation of the IP address to the device 113 is performed by, e.g., a router (the illustration thereof is omitted) connected to the LAN.

For example, when it is assumed that a request to acquire the content in the record 1801 in the first row in FIG. 18 is acquired in S601, in the acquisition request, the device ID (=4D454930-0100-1000-8001-04209AA30243) is included. Since the same device ID has been registered in the device information item in FIG. 15, the address generation section 111 acquires the device information item in FIG. 15.

Next, the address generation section 111 determines, from the device information item acquired in S602, whether or not the device 113 storing therein the target content is on line (S603). When the corresponding device 113 is off line (NO in S603), the process is advanced to S604. When the corresponding device 113 is on line (YES in S603), the process is advanced to S606.

Here, the address generation section 111 specifies the current allocation period log among the allocation period logs registered in the device information item acquired in S602. When the connection state in the specified current allocation period log is On Line, the address generation section 111 may appropriately determine that the answer is YES and, when the connection state is Off Line, the address generation section 111 may appropriately determine that the answer is NO.

For example, when it is assumed that the device information item in FIG. 15 is acquired in S602, On Line has been registered as the connection state in a record 1501 of the current allocation period log so that the address generation section 111 determines that the corresponding device 113 is on line.

Note that, when the power source of the device 113 can be controlled to be turned ON or OFF via the LAN, the address generation section 111 may also give an instruction to turn ON the power source to the device 113 to activate the device 113 and then determine whether or not the content information can be acquired from the device 113.

In S604, the address generation section 111 determines whether or not the target content has been stored in another device 113. Here, the address generation section 111 may appropriately reference the space of the specific information of the content information of the device 113 storing therein the target content and determine that the target content has been stored in another device 113 when information related to the place to which the content has been duplicated has been registered in the space.

FIG. 14 is a view showing an example of the data configuration of the content information after the content having the file name "P102008.jpg" in the content information in FIG. 13 was duplicated from the digital camera 1006 to the HDD recorder 1005.

The content shown in a record 1301 in FIG. 13 and having the file name "P102008.jpg" has been duplicated from the digital camera 1006 as the storage place to the HDD recorder 1005. Accordingly, in the space of the specific information of the record 1301 shown in FIG. 14, as information 1401 related to the place where the content has been duplicated, the device ID of the HDD recorder 1005 has been registered.

As a result, even when the address generation section 111 has determined in S603 that the digital camera 1006 as the device 113 storing therein the target content is off line, the address generation section 111 can determine in S604 that the target content can be acquired from the HDD recorder 1005 from the information 1401 registered in the space of the specific information in the record 1301 shown in FIG. 14. Note that this process of updating the content information is performed by the content information update section 108. Details of the process will be described later.

When information related to the place to which the target content has been duplicated has been registered in the content information of the device 113 storing therein the target content (YES in S604), the address generation section 111 returns the process to S602 and acquires the device information of the device 113 as the place to which the target content has been duplicated.

On the other hand, when information related to the place to which the target content has been duplicated has not been registered in the content information of the device 113 storing therein the target content (NO in S604), the address generation section 111 notifies the application execution section 112 that the target content cannot be acquired (S605).

In S606, the address generation section 111 generates an acquisition address for the target address (S606) and notifies the application execution section 112 of the acquisition address. In this case, using the file name of the target content included in the acquisition request as a key, the address generation section 111 specifies the file path of the target content in the content information item of the device 113 storing therein the target content and combines the file name of the target content with the file path thereof to generate the URL of the target file. Then, the address generation section 111 generates data including the IP address acquired in S602 and the URL of the target content as the acquisition address.

For example, when it is assumed that the device 113 storing therein the target content is the HDD recorder 1005 and the target content is the content having the file name "MOL003.mpg" shown in FIG. 11, the address generation section 111 acquires the file path "¥MOVIE¥20111206¥" of the target content from the content information in FIG. 11 using the file name "MOL003.mpg" as a key and connects the file name to the rear end of the acquired file path to generate a URL "¥MOVIE¥20111206¥MOL003.mpg".

Since "now" is written in the space of the allocation period log of the record 1501 of the device information item shown in FIG. 15, the address generation section 111 determines that the current IP address of the HDD recorder 1005 is registered in the record 1501 and acquires "192.168.0.6" which is the IP address registered in the record 1501 as the current IP address of the device 113. Then, the address generation section 111 generates data which is a combination of the URL "¥MOVIE¥20111206¥MOL003.mpg" and the IP address "192.168.0.6" as the acquisition address.

Note that Process 3 shown in FIG. 5 may also be configured to be executed every time Process 4 in FIG. 6 is executed. Thus, Process 4 is ended and the process is advanced to Processes subsequent to Process 4 in FIG. 2.

Figure 7:
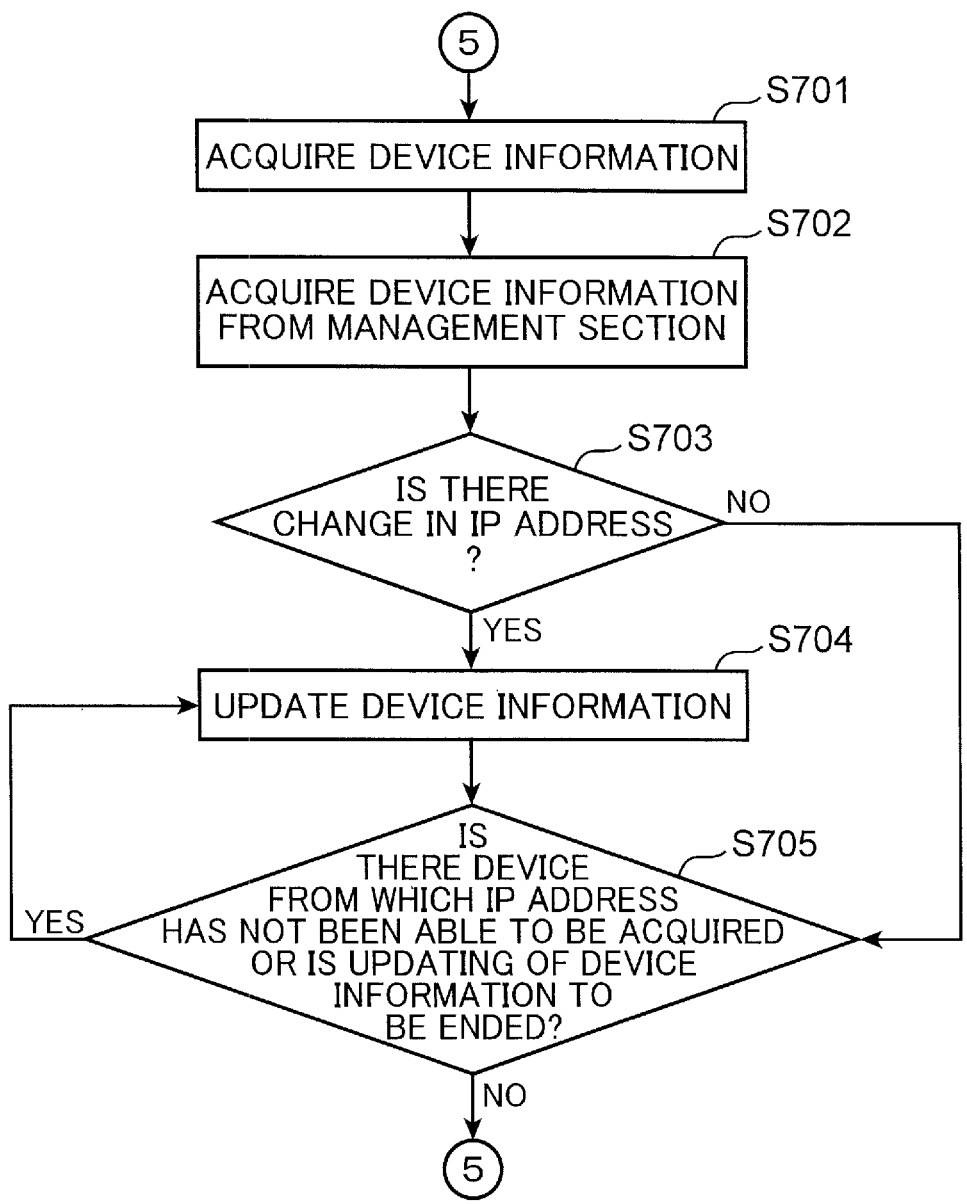
FIG. 7 is a flow chart of Process 5 shown in FIG. 2.

FIG. 7 is a flow chart of Process 5 shown in FIG. 2. The process in S701 to S705 in FIG. 7 is executed by the device information collection section 109. Process 5 is executed when the state of the device 113 has changed. When the state thereof has changed, the device 113 may appropriately notify the device information collection section 109 of the state change and cause the device information collection section 109 to detect the state change.

First, the device information collection section 109 acquires the device information in which the device ID is associated with the current IP address from the device 113 connected to the same LAN to which the display device 103 is connected (S701). In this case, the device information collection section 109 may appropriately transmit a request to acquire the device information by broadcasting and acquire the device information from the device 113 on line.

Then, the device information collection section 109 acquires the device information item associated with the device ID included in the device information acquired in S701 from the management section 107 (S702).

For example, when the device ID included in the device information acquired in S701 is "4D454930-0100-1000-8001-04209AA30243", the device information collection section 109 acquires the device information item shown in FIG. 15 from the management section 107.

Then, the device information collection section 109 determines whether or not there has been a change from the current IP address included in the device information item acquired in S701 to the current IP address registered in the device information item acquired in S702 (S703). Then, when determining that there has been a change in the current IP address (YES in S703), the device information collection section 109 advances the process to S704. When determining that there has been no change in the current IP address (NO in S703), the device information collection section 109 advances the process to S705.

In S704, the device information collection section 109 registers the current IP address in the device information item acquired in S702 to update the device information item. For example, it is assumed that the device information item in FIG. 15 is acquired from the management section 107 in S702, the device information item in which the device ID "4D454930-0100-1000-8001-04209AA30243" is associated with the IP address "192.168.0.7" is acquired in S701, and the time when the device information is acquired is Jul. 12, 2012 at 05:30.

In this case, the device information collection section 109 writes, in the device information item shown in FIG. 15, "192.168.0.7" in the space of the IP address, writes "On Line" in the space of the connection state, and writes "2012/07/12 5:30 to now" in the space of the allocation period log.

Next, the device information collection section 109 determines whether or not there is the device 113 from which the IP address has not been able to be acquired among the devices 113 the device information of which has been stored in the management section 107 (S705). When there is the device 113 from which the IP address has not been able to be acquired (YES in S705), the device information collection section 109 returns the process to S704 and regards the corresponding device 113 as the off-line device 113 not connected to the LAN. In this case, the device information collection section 109 registers information showing that the IP address is currently not allocated to the device 113 and the device 113 is off line in the device information of the corresponding device 113.

For example, it is assumed that the device information cannot be acquired from the HDD recorder 1005 in S701 and the time when Process 5 is executed is Jul. 13, 2012 at 10:30. In this case, the device information collection section 109 leaves, in the device information item shown in FIG. 15, the space of the IP address blank, writes "Off Line" in the space of the connection state, and writes "2012/07/13 10:30 to now" in the space of the allocation period log.

When there is no device 113 from which the IP address has been unable to be acquired in S705 (NO in S705) or when the updating of all the device information items registered in the management section 107 is completed (NO in S705), the process is ended and the process advances to Processes subsequent to Process 5 in FIG. 2.

Figure 8:
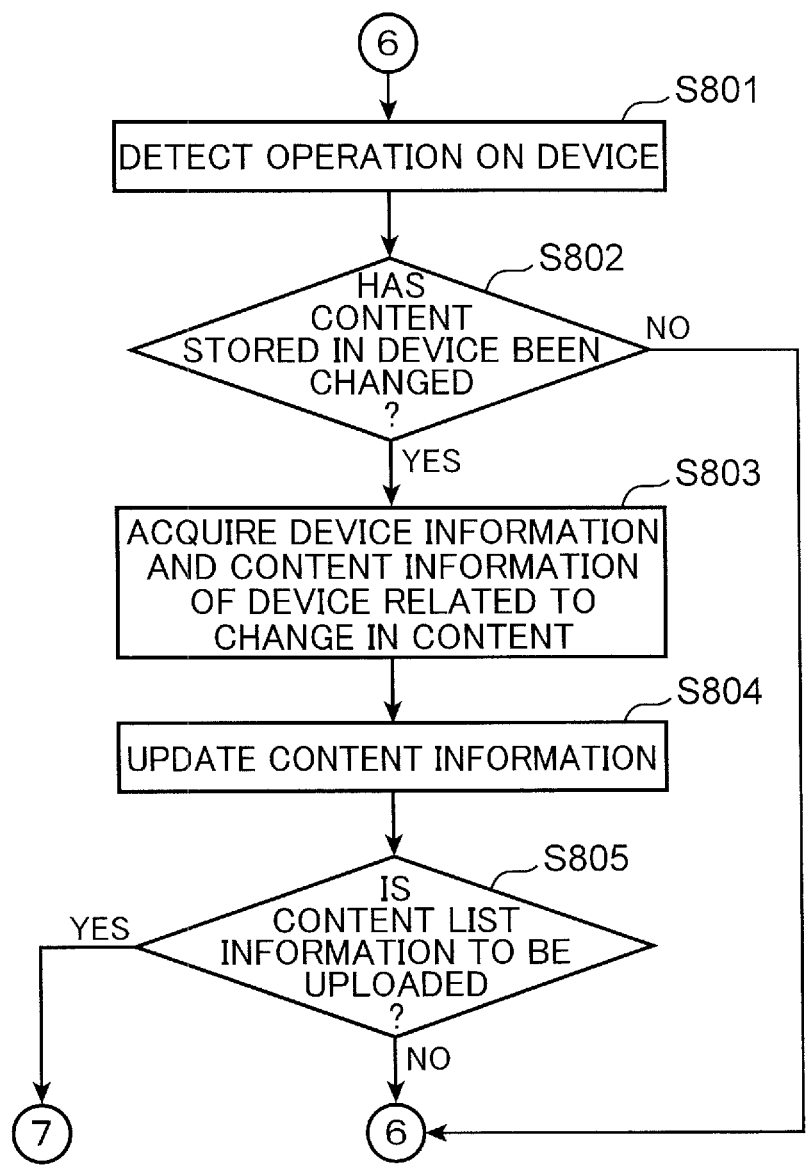
FIG. 8 is a flow chart of Process 6 shown in FIG. 2.

FIG. 8 is a flow chart of Process 6 shown in FIG. 2. S801 to S04 are executed by the content information update section 108 and S805 is executed by the transmission section 105.

First, the content information update section 108 detects that any operation has been performed on the device 113 by a user (S801). Here, the content information update section 108 monitors an operation notification issued from the device 113 during operation of the device 113. By receiving the operation notification, the content information update section 108 may appropriately detect that an operation has been performed on the device 113. Examples of the operation for which the device 113 issues the operation notification include the file upload operation defined in the UPnP.

Next, the content information update section 108 determines whether or not the content stored in the device 113 has been changed (S802). Here, when information showing the content of the operation included in the operation notification shows addition, movement, deletion, duplication, or the like, the content information update section 108 may appropriately determine that the content has been changed.

Then, when the content stored in the device 113 has been changed (YES in S802), the content information update section 108 acquires the content information of the device 113 related to the change in the content from the management section 107 (S803).

Then, the content information update section 108 writes information related to the change in the content in the content information acquired in S803 to update the content information (S804).

For example, when the operation on the content is movement, the content information update section 108 adds a file name, a file path, and specific information in the device 113 to which the content has been moved to the content information of the device 113 to which the content has been moved and writes the device ID of the device 113 to which the content has been moved in the space of the specific information of the corresponding content in the content information of the device 113 to which the content has been moved.

Note that, when the operation on the content is movement, the operation notification from the device 113 is caused to include information items such as the file name of the moved content and the file path in the device to which the content has been moved, and the content information update section 108 may appropriately recognize the moved content and the file path in the device to which the content has been moved from these information items.

When the operation on the content is duplication, the content information update section 108 adds a file name, a file path, and specific information in the device 113 to which the content has been duplicated to the content information in the device 113 to which the content has been duplicated and writes the device ID of the device 113 to which the content has been duplicated in the space of the specific information of the corresponding content in the content information of the device 113 from which the content has been duplicated.

Note that, when the operation on the content is duplication, the operation notification from the device 113 is caused to include information items such as the file name of the duplicated content and the file path in the device in which the content has been duplicated, and the content information update section 108 may appropriately recognize the duplicated content and the file path in the device to which the content has been duplicated from these information items.

When the operation on the content is addition, the content information update section 108 adds a file name, a file path, and specific information in the device 113 to which the content is added to the content information of the device 113.

Note that, when the operation on the content is addition, the operation notification from the device 113 is caused to include information items such as the file name of the added content and the file path in the device to which the content has been added, and the content information update section 108 may appropriately recognize the added content and the file path in the device to which the content has been added from these information items.

When the operation on the content is deletion, the content information update section 108 writes information showing that the corresponding content has been deleted in the space of the specific information of the content information of the device 113 from which the content has been deleted.

Note that, when the operation on the content is deletion, the operation notification from the device 113 is caused to include information items such as the file name of the deleted content, and the content information update section 108 may appropriately recognize the deleted content from the information items.

Next, a specific example will be shown of the case where the content has been duplicated from the digital camera 1006 to the HDD recorder 1005.

The content shown in the record 1301 in FIG. 13 has been changed from the digital camera 1006 to the HDD recorder 1005. As a result, in FIG. 14, in the space of the specific information of the record 1301, the device ID of the HDD recorder 1005 has been registered.

FIG. 12 is a view showing an example of the data configuration of the content information after the content having the file name "P102008.jpg" in the content information in FIG. 11 was duplicated from the digital camera to the HDD recorder.

As a result of the duplication, in the content information of the HDD recorder 1005 shown in FIG. 12, a record 1201 including information related to the duplicated content having the file name "P102008.jpg" has been newly registered.

In the record 1201, in the spaces of the file name and the specific information, the same information as the file name and the specific information in the record 1301 shown in FIG. 13 has been written and, in the space of the file path, "¥PHOTO¥20120713¥" which is the file path of the corresponding content in the HDD recorder 1005 has been written.

Thus, in the content information managed by the management section 107, information on the real file path of the content stored in the device 113 is reflected.

Back to FIG. 8, the transmission section 105 determines whether or not the content list information in which the updated content information is reflected is to be uploaded to the application generation device 102 of the personal cloud service 101 (S805).

Here, the transmission section 105 may appropriately determine that the content list information is to be uploaded when a time equal to or longer than a given time has elapsed from the time when the content list information was previously updated or when the number of the contents the storage places of which have been changed reaches a value equal to or more than a given number. When the content list information is to be uploaded (YES in S805), the process is advanced to S306 in FIG. 3. On the other hand, when the content list information is not to be uploaded (NO in S805), Process 6 is ended and the process is advanced to Processes subsequent to Process 6 in FIG. 2.

Thus, with the content management device of the present embodiment, from the content information managed by the management section 107, the content list information in which all the contents managed by the management section 107 are associated with the device IDs of the devices 113 storing therein the individual contents is generated and uploaded to the application generation device 102.

The application generation device 102 extracts the contents related to the Web content in which the user is interested from the uploaded content list information, generates a viewing application in which the content list information of the extracted contents is integrated, and downloads the viewing application to the application execution section 112.

The application execution section 112 gives, to the access control section 110, an acquisition request including the file name and file path of the target content and the device ID of the device storing therein the target content each included in the downloaded viewing application.

When the acquisition request is given, the address generation section 111 acquires the current file path and IP address of the target content from the content information and the device information each managed by the management section 107, generates an acquisition address from these information items, and returns the acquisition address to the application execution section 112.

Here, even when the IP address or the file path is changed, the content list information is not immediately uploaded to the application generation device 102. Accordingly, the file path of the target content included in the viewing application may possibly be different from the real file path.

However, during the period from the uploading of the content list information to the application generation device 102 to the next uploading thereof, the device information collection section 109 detects a change in the state of the device 113 and, when the IP address has been changed, the device information collection section 109 writes the changed IP address in the device information. During the period from the uploading of the content list information to the application generation device 102 to the next uploading thereof, the content information update section 108 detects an operation on the device 113 and, when the file path of the content has been changed, the content information update section 108 writes the file path in the content information.

Accordingly, even when the IP address is updated during the period from the uploading of the content list information to the application generation device 102 to the next uploading thereof, in the device information stored in the management section 107, the updated IP address (i.e., the current IP address or the real IP address) is registered.

Even when the file path is updated during the period from the uploading of the content list information to the application generation device 102 to the next uploading thereof, in the content information stored in the management section 107, the updated file path (i.e., the current file path or the real file path) is registered.

As a result, even when the application execution section 112 specifies the IP address and the file path each included in the viewing application and gives a request to access the target content during the period during which the IP address or file path of the target content included in the viewing application is different from the real IP address or file path thereof, the address generation section 111 can generate the acquisition address including the real file path and IP address of the target content on the basis of the content information and the device information each stored in the management section 107 and return the acquisition address to the application execution section 112. Therefore, it is possible to prevent the application execution section 112 from being unable to acquire the target content.

Embodiment 2

A content management device of Embodiment 2 is characterized in that a data configuration of content list information is different from that in Embodiment 1.

FIG. 19 is a view showing an example of the data configuration of the content list information in Embodiment 2. Note that, in the present embodiment, a description of the same things as in Embodiment 1 is omitted.

As shown in FIG. 19, in the content list information of Embodiment 2, the space of the device ID has been removed from the content list information shown in FIG. 17, while the spaces of an IP address and a collection time have been added thereto. In the present embodiment, the IP address and the collection time correspond to an example of device specification information for specifying the device 113.

In FIG. 19, as the IP address, the IP address allocated to the device 113 from which content information was collected when the content information was collected by the content information collection section 106 or the content information update section 108 is used. On the other hand, as the collection time, the time when the content information was collected is used.

The transmission section 105 consolidates the content information items stored in the management section 107, associates each of the contents with the IP address of the device storing therein the content and the collection time to generate the content list information, and uploads the content list information to the application generation device 102.

In the present embodiment, the content information shown in FIG. 11 or the like is associated with the collection time and the device ID and registered. This allows the transmission section 105 to acquire the device information from the device ID with which the content information is associated and specify, in the device information, the IP address allocated to the corresponding device 113 at the time when the content information was collected.

FIG. 20 is a view showing an example of the data configuration of the content list information integrated in a viewing application in Embodiment 2. As shown in FIG. 20, the content list information integrated in the viewing application in Embodiment 2 further has the space of the collection time added to the content list information shown in FIG. 18.

Here, as a domain name, the IP address written in the content list information shown in FIG. 19 is used when the content is an at-home content and the domain name written in the content list information shown in FIG. 19 is used when the content is a Web content. The collection time, the file name, and the file path are the same as in FIG. 19. The viewing application shown in FIG. 20 is executed by the application execution section 112.

Next, in Embodiment 2, a process when the address generation section 111 generates an acquisition address will be described using the flow chart of FIG. 6.

In the same manner as in Embodiment 1, Process 4 shown in FIG. 6 is executed when a request to acquire a target content is given from the application execution section 112.

First, the address generation section 111 receives the request to acquire the target content (S601). Here, the acquisition request includes the domain name of a target address, the collection time thereof, the file name thereof, and the file path thereof.

Next, the address generation section 111 acquires, from among the device information items stored in the management section 107, the device information item of the device 113 to which the IP address shown by the domain name included in the acquisition request was allocated at the collection time and acquires the current IP address from the acquired device information item (S602).

For example, it is assumed that the acquisition request including the domain name "192.168.0.3" and the collection information "2012/07/09 12:13" each registered in a record 2001 in FIG. 20 is acquired in S601. In this case, the address generation section 111 specifies, from among the management information items stored in the management section 107, the device information item in which the IP address is "192.168.0.3" at the time "2012/07/09 12:13".

In the device information of the HDD recorder 1005 shown in FIG. 15, at "2012/07/09 12:13", the IP address "192.168.0.3" is allocated to the HDD recorder 1005. Accordingly, the address generation section 111 acquires the device information item shown in FIG. 15 and acquires the current IP address "192.168.0.6" from the device information item.

Since S603 to S606 are the same as in Embodiment 1, a description thereof is omitted. Thus, Process 4 is ended and the process is advanced to Processes subsequent to Process 4 in FIG. 2.

Thus, with the content management device of Embodiment 2, even when the content list information is caused to include the IP address and the collection time instead of the device ID, in the same manner as in Embodiment 1, it is possible to notify the application execution section 112 of the acquisition address including the real file path of the target content.

In Embodiments 1 and 2, both of the application execution section 112 and the content management device 104 are mounted in the display device 103, but a device in which the application execution section 112 and the content management device 104 are mounted is not limited thereto. The application execution section 112 and the content management device 104 may also be mounted in another device. In this case, it may also be possible that the content management device 104 is mounted in, e.g., a home server which manages at-home contents and the application execution section 112 is mounted in a mobile terminal such as a smart phone or a tablet terminal or a standalone device such as a desktop personal computer.

Note that, to detect a change in the state of the device 113 connected to the LAN or an operation on the device 113, the content management device 104 is preferably constantly connected to the LAN. Accordingly, when the content management device 104 is mounted in a mobile terminal, the mobile terminal is not intended to be used to be carried by the user, but is preferably intended to be used as a standalone type. For example, a case can be listed in which a smart phone or a table terminal is used as a home server.

In Embodiments 1 and 2, the application generation device 102 is provided on the Web 1002, but the place where the application generation device 102 is provided is not limited thereto. The application generation device 102 may also be formed on the LAN. In this case, the application generation device 102 may appropriately be mounted in a home server provided on the LAN.

In Embodiments 1 and 2, the device 113 is provided on the LAN. However, the place where the device 113 is provided is not limited thereto. The device 113 may also be connected via a WAN such as VPN. In this case, as long as access from the display device 103 is authenticated by the device 113, the display device 103 may appropriately manage the content stored in the device 113 as an at-home content.

Next, a description will be given of a hardware configuration of the display device 103 including the content management device 104 and the application generation device 102 each described in Embodiments 1 and 2.

Figure 21:
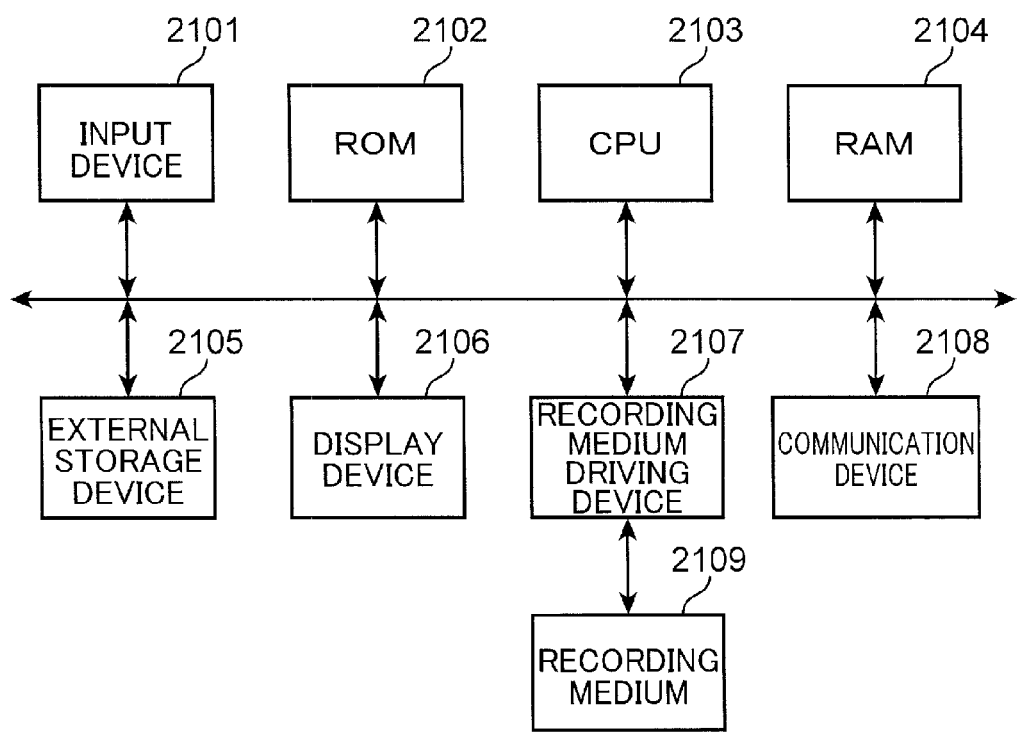
FIG. 21 is a view showing an example of a hardware configuration of a computer for implementing each of a display device including the content management device and an application generation device in Embodiments 1 and 2.

FIG. 21 is a view showing an example of a hardware configuration of a computer which implements each of the display device 103 and the application generation device 102.

The computer includes an input device 2101, a ROM (Read Only Memory) 2102, a CPU (Central Processing Unit) 2103, a RAM (Random Access Memory) 2104, an external storage device 2105, a display device 2106, a recording medium driving device 2107, and a communication device 2108. Each of the blocks is connected to an internal bus. Via the bus, various data and the like are input/output and, under the control of the CPU 2103, various processes are executed.

The input device 2101 is formed of a keyboard, a mouse, and the like and used by a user for inputting various data. In the ROM 2102, a system program such as BIOS (Basic Input/Output System) is stored. The external storage device 2105 is formed of a hard disk drive and the like and stores therein a content management program for causing a predetermined OS (Operating System) and the computer to function as the content management device 104, an application generation program for causing a predetermined OS and the computer to function as the application generation device 102, and the like. The CPU 2103 reads the OS from the external storage device 2105 and controls the operation of each of the blocks. The RAM 2104 is used as the work space of the CPU 2103 and the like.

The display device 2106 is formed of, e.g., a liquid crystal display or an organic EL display to display various images under the control of the CPU 2103. The recording medium driving device 2107 is formed of a DVD-ROM drive, a flexible disk drive, or the like.

Note that the content management program and the application generation program are stored in a computer readable recording medium 2109 such as a DVD-ROM and provided to the user. The user causes the recording medium driving device 2107 to read the recording medium 2109 to install the content management program or the application generation program on the computer. It may also be possible to store the content management program and the application generation program in a WEB server on the Internet and download the content management program and the application generation program from the WEB server to install the content management program and the application generation program on the computer.

The communication device 2108 is formed of, e.g., a communication device for connecting the computer to the LAN and the Internet. Under the control of the CPU 2103, the communication device 2108 transmits/receives data to/from another device via the Internet.

Each of the functional blocks in FIG. 1 is typically implemented as a program processed cooperatively by a processor and an external memory, but may also be implemented by an LSI as an integrated circuit. Each of these functional blocks may individually be formed in one chip or any or all of these functional blocks may be included and formed in one chip. Here, the LSI is used, but the LSI may also be called an IC, a system LSI, a super LSI, or an ultra LSI in accordance with the different degrees of integration.

A method for implementing the integrated circuit is not limited to the one using the LSI. The integrated circuit may also be implemented by a dedicated circuit or a versatile processor. It may also be possible to use, after the production of the LSI, an FPGA (Field Programmable Gate Array) that can be programmed or a reconfigurable processor which allows the connection between circuit cells in the LSI and the setting thereof to be reconfigured.

If a technique for implementing the integrated circuit which replaces the LSI appears as a result of the advancement of a semiconductor technology or another technology derived therefrom, the technique may naturally be used to integrate the functional blocks.

It may also be possible that any or all of the components included in the content management device 104 and the application generation device 102 in Embodiments 1 and 2 are each formed of one system LSI (Large Scale Integration: large-scale integrated circuit).

The system LSI is a super multifunctional LSI produced by integrating a plurality of components on one chip. Specifically, the system LSI is a computer system configured by including a microprocessor, a ROM, a RAM, and the like. In the foregoing ROM, a computer program is stored. Through the operation of the foregoing microprocessor in accordance with the foregoing computer program, the system LSI achieves the function thereof.

Note that, here, the system LSI is used, but the system LSI may also be called an IC, an LSI, a super LSI, or an ultra LSI in accordance with the different degrees of integration. A method for implementing the integrated circuit is not limited to the one using the LSI. The integrated circuit may also be implemented by a dedicated circuit or a versatile processor. It may also be possible to use, after the production of the LSI, an FPGA (Field Programmable Gate Array) that can be programmed or a reconfigurable processor which allows the connection between circuit cells in the LSI and the setting thereof to be reconfigured.

If a technique for implementing the integrated circuit which replaces the LSI appears as a result of the advancement of a semiconductor technology or another technology derived therefrom, the technique may naturally be used to integrate the functional blocks. It is quite possible to apply a biotechnology or the like thereto.

Summarization of Present Embodiment (1) A content management device according to the present embodiment includes a content information collection section that collects content information in which a content identifier of a content held in a device connected thereto via a network is associated with storage place information showing a place where the content is stored, a device information collection section that detects a change in a state of the device and collects, from the device, device information in which a device identifier of the device is associated with a communication identifier, a management section that manages the content information and the device information, a content information update section that detects an operation on the content in the device and records, in the content information, the storage place information of the content the storage place of which has been changed by the operation in association with the content identifier, a transmission section that generates, on the basis of the content information, content list information in which the content identifier and the storage place information are associated with device specification information for specifying the device storing therein the content, and transmits the generated content list information to an application generation device, and an address generation section that specifies, upon receipt of an acquisition request including the content identifier of a target content and the device specification information of the device as the storage place from a viewing application for viewing the content generated by the application generation device on the basis of the content list information, current storage place information of the target content and the communication identifier thereof in the content information and the device information on the basis of the acquisition request and generates an acquisition address for acquiring the target content from the device on the basis of the specified storage place information and communication identifier.

With the configuration, the content list information in which all the contents managed by the management section are associated with the device specification information for specifying the devices storing therein the individual contents is generated on the basis of the content information managed by the management section and uploaded to the application generation device.

The application generation device extracts, e.g., the contents in which a user is interested from the uploaded content list information and generates the viewing application in which the content list information of the extracted contents is integrated.

The viewing application gives, to the address generation section, a request to acquire a target content to be viewed which includes the content identifier of the target content and the device specification information for specifying the device storing therein the target content.

When the acquisition request is given, the address generation section acquires the current storage place information of the target content and the communication identifier thereof from the content information and the device information each managed by the management section, generates an acquisition address from these information items, and returns the acquisition address to the viewing application.

Here, even when the communication identifier and the storage place information are changed, the content list information is not immediately uploaded to the application generation device. Accordingly, the storage place information of the target content included in the viewing application may possibly be different from the real storage place information.

However, the device information collection section detects a change in the state of the device and, when the communication identifier has been changed, the device information collection section writes the changed communication identifier in the device information. The content information update section detects an operation on the device and, when the storage place information of the content has been changed, the content information update section writes the storage place information in the content information.

Consequently, in the device information stored in the management section, the current communication identifier is registered and, in the content information stored in the management section, the current storage place information is registered.

As a result, even when the storage place information of the target content included in the viewing application is different from the real storage place information, the address generation section can generate the acquisition address including the real storage place information of the target content and the communication identifier thereof and return the acquisition address to the viewing application. Therefore, it is possible to prevent the viewing application from being unable to acquire the target content.

(2) The content management device may further include an access control section that determines, upon receipt of an authentication request from the viewing application, whether or not a device which executes the viewing application corresponds to a preliminarily registered device to which a right to access the content is authorized and gives, when the device which executes the viewing application is determined to correspond to the preliminarily registered device, a response which authorizes the access right to the viewing application.

With the configuration, only the device which executes the viewing application and to which the right to access the content is authorized is allowed to access the content. Therefore, it is possible to prevent the content from being flown into a device to which the access right is not authorized.

(3) The device specification information may be formed of the device identifier, and the device identifier may be a UDN (Unique Device Name).

With the configuration, the device identifier formed of the UDN is used as the device specification information. Therefore, the address generation section can specify the device information using the UDN as a key and acquire the current communication identifier from the device information.

(4) The device specification information is the communication identifier and a collection time when the content information is collected, and the device information collection section may register, in the device information, an allocation period log in which the device identifier is associated with a period during which the communication identifier is allocated to the device.

With the configuration, in the device information, the allocation period log in which the device identifier is associated with the period during which the communication identifier is allocated to the device has been registered. This allows the address generation section to compare the communication identifier and the collection time when the content information included in the acquisition request is collected to the allocation period log registered in the device information, specify the device information of the device storing therein the target content, and specify the current communication identifier of the corresponding device in the device information. As a result, even when the communication identifier and the collection time when the content information is collected is used as the device specification information, the address generation section can generate the real acquisition address.

(5) The application generation device may extract, from the Internet, a Web content in which a user is highly interested on the basis of a Web content viewing history of the user, extract, from the content list information, an at-home content highly related to the extracted Web content among at-home contents stored in the device, and generate the viewing application for viewing the extracted Web content and at-home content.

With the configuration, the viewing application is generated in which the at-home content related to the Web content in which the user is highly interested is extracted. This can enhance the user's interest in viewing the at-home content.

(6) When a period equal to or longer than a given period has elapsed from previous transmission of the content list information, the transmission section may generate the content list information and transmit the content list information to the application generation device.

With the configuration, even when the content information and the device information are updated, the contents thereof are not immediately reflected in the content list information to increase the possibility that the storage place information of the content included in the viewing application does not correspond to the current storage place information thereof. However, by the process by the address generation section described above, the acquisition address including the current storage place information of the content is generated. As a result, it is possible to prevent a situation in which the viewing application cannot acquire the content.

(7) The device information includes a connection state showing whether or not the device is currently connected to the network, and the address generation section may determine, when the connection state of the device storing therein the target content is off line, whether or not the target content is stored in another device from the content information, specify, when the target content is stored in the other device and the other device is on line, a communication identifier of the other device in the device information, and generate the acquisition address on the basis of the specified communication identifier.

With the configuration, even when the device storing therein the target content is off line, a duplication of the target content is stored in another device and, when the other device is on line, the target content is acquired from the other device.

INDUSTRIAL APPLICABILITY

The content management device of the present invention is useful in a content viewing system which causes a personal cloud service to generate a viewing application for viewing an at-home content and causes a display device possessed by a user to execute the viewing application.

The invention claimed is:

1. A content management device, comprising:
a hardware processor, and a non-transitory memory having stored thereon a program that causes the content management device to function as:
a content information collection section that collects content information in which a content identifier of a content held in a device connected thereto via a network is associated with a file path showing a storage place where the content is stored, the file path having a tree structure representing a path from a root directory to a nearest directory storing therein the content;
a device information collection section that detects a change in a state of the device and collects, from the device, device information in which a device identifier of the device is associated with a communication identifier;
a management section that manages the content information and the device information;
a content information update section that detects an operation on the content in the device and records, in the content information, the file path of the content the storage place of which has been changed by the operation in association with the content identifier;
a transmission section that, when the number of the contents that the storage places of which have been changed reaches a value equal to or more than a given number, generates, on the basis of the content information, content list information, which comprises the content identifier, the file path, and are associated device specification information for specifying the device storing therein the content, and transmits the generated content list information to an application generation device; and
an address generation section that specifies, upon receipt of an acquisition request, which comprises the content identifier of a target content, the file path of the target content, and the associated device specification information, from an application execution section which executes a viewing application for viewing the content generated by the application generation device on the basis of the content list information, a current file path of the target content by referring to the content information updated by the content information update section using the content identifier included in the acquisition request as a key,
acquires the communication identifier of the device that has the target content stored therein by referring to the device information collected by the device information collection section, and
generates an acquisition address for acquiring the target content from the device by combining the specified current file path, the specified communication identifier, and the content identifier of the target content, wherein
during a period from uploading of the content list information to the application generation device to next uploading thereof, the device information collection section detects a change in the state of the device, and writes the communication identifier in the device information managed by the management section when the communication identifier has been changed,
during the period from the uploading of the content list information to the application generation device to the next uploading thereof, the content information update section detects an operation on the device, and writes the file path in the content information managed by the management section when the file path of the content has been changed,
during a period in which the file path and the device specification information of the target content each included in the content list information are different from the current file path and current device specification information, when receiving the acquisition request of the target content from the application execution section by specifying the content identifier of the target content, and the device specification information and the file path of the target content each included in the content list information, the address generation section generates the acquisition address by combining the content identifier of the target content with the current file path and a current communication identifier each managed by the management section, and notifies the application execution section of the acquisition address, and
the application execution section acquires the target content from the device by specifying the acquisition address notified by the address generation section.

2. The content management device according to claim 1, further comprising:
an access control section that determines, upon receipt of an authentication request from the viewing application, whether or not a device which executes the viewing application corresponds to a preliminarily registered device to which a right to access the content is authorized and gives, when the device which executes the viewing application is determined to correspond to the preliminarily registered device, a response which authorizes the access right to the viewing application.

3. The content management device according to claim 1, wherein
the device specification information is formed of the device identifier, and
the device identifier is a UDN (Unique Device Name).

4. The content management device according to claim 1, wherein
the device specification information is the communication identifier and a collection time when the content information is collected, and
the device information collection section registers, in the device information, an allocation period log in which the device identifier is associated with a period during which the communication identifier is allocated to the device.

5. The content management device according to claim 1, wherein the application generation device extracts, from the Internet, a Web content in which a user is highly interested on the basis of a Web content viewing history of the user, extracts, from the content list information, an at-home content highly related to the extracted Web content among at-home contents stored in the device, and generates the viewing application for viewing the extracted Web content and at-home content.

6. The content management device according to claim 1, wherein, when a period equal to or longer than a given period has elapsed from previous transmission of the content list information, the transmission section generates the content list information and transmits the content list information to the application generation device.

7. The content management device according to claim 1, wherein the device information includes a connection state showing whether or not the device is currently connected to the network, and the address generation section determines, when the connection state of the device storing therein the target content is off line, whether or not the target content is stored in another device from the content information, specifies, when the target content is stored in the other device and the other device is on line, a communication identifier of the other device in the device information, and generates the acquisition address on the basis of the specified communication identifier.

8. A content management method to be implemented using a content management device, the content management method comprising:

a content information collection step of causing the content management device to collect content information in which a content identifier of a content held in a device connected thereto via a network is associated with a file path showing a storage place where the content is stored, the file path having a tree structure representing a path from a root directory to a nearest directory storing therein the content;

a device information collection step of causing the content management device to detect a change in a state of the device and collect, from the device, device information in which a device identifier of the device is associated with a communication identifier;

a management step of causing the content management device to manage the content information and the device information;

a content information update step of causing the content management device to detect an operation on the content in the device and record, in the content information, the file path of the content the storage place of which has been changed by the operation in association with the content identifier;

a transmission step of causing the content management device, when the number of the contents that the storage places of which have been changed reaches a value equal to or more than a given number, to generate, on the basis of the content information, content list information, which comprises the content identifier, the file path, and associated device specification information for specifying the device storing therein the content, and transmits the generated content list information to an application generation device; and an address generation step of causing the content management device to specify, upon receipt of an acquisition request, which comprises the content identifier of a target content, the file path of the target content, and the associated device specification information, from an application execution section which executes a viewing application for viewing the content generated by the application generation device on the basis of the content list information, a current file path of the target content by referring to the content information updated by the content information update section using the content identifier included in the acquisition request as a key, acquire the communication identifier of the device that has the target content stored therein by referring to the device information collected by the device information collection step, and generate an acquisition address for acquiring the target content from the device by combining the specified current file path, the specified communication identifier, and the content identifier of the target content, wherein during a period from uploading of the content list information to the application generation device to next uploading thereof, in the device information collection step, a change in the state of the device is detected, and the communication identified is written in the device information managed by the management step when the communication identifier has been changed, during the period from the uploading of the content list information to the application generation device to the next uploading thereof, in the content information update step, an operation on the device is detected, and the file path is written in the content information managed by the management step when the file path of the content has been changed, in the address generation step, during a period in which the file path and the device specification information of the target content each included in the content list information are different from the current file path and current device specification information, when the acquisition request of the target content is received from the application execution section by specifying the content identifier of the target content, and the device specification information and the file path of the target content each included in the content list information, the acquisition is generated by combining the content identifier of the target content with the current file path and a current communication identifier each managed by the management step, and notifying the application execution section of the acquisition address, and the application execution section acquires the target content from the device by specifying the acquisition address notified by the address generation step.

9. An integrated circuit in a content management device, the integrated circuit comprising:

a content information collection section that collects content information in which a content identifier of a content held in a device connected thereto via a network is associated with a file path showing a storage place where the content is stored, the file path having a tree structure representing the path from a root directory to a nearest directory storing therein the content;

a device information collection section that detects a change in a state of the device and collects, from the device, device information in which a device identifier of the device is associated with a communication identifier;

a management section that manages the content information and the device information; and a content information update section that detects an operation on the content in the device and records, in the content information, the file path of the content the storage place of which has been changed by the operation in association with the content identifier, the integrated circuit further comprising:

a transmission section that, when the number of the contents that the storage places of which have been changed reaches a value equal to or more than a given number, generates, on the basis of the content information, content list information, which comprises the content identifier, the file path, and associated device specification information for specifying the device storing therein the content, and transmits the generated content list information to an application generation device; and an address generation section that specifies, upon receipt of an acquisition request, which comprises the content identifier of a target content, the file path of the target content, and the associated device specification information, from an application execution section which executes a viewing application for viewing the content generated by the application generation device on the basis of the content list information, a current file path of the target content by referring to the content information updated by the content information update section using the content identifier included in the acquisition request as a key, acquires the communication identifier of the device that has the target content stored therein by referring to the device information collected by the device information collection section, and generates an acquisition address for acquiring the target content from the device by combining the specified current file path, the specified communication identifier, and the content identifier of the target content, wherein during a period from uploading of the content list information to the application generation device to next uploading thereof, the device information collection section detects a change in the state of the device, and writes the communication identifier in the device information managed by the management section when the communication identifier has been changed, and during the period from the uploading of the content list information to the application generation device to the next uploading thereof, the content information update section detects an operation on the device, and writes the file path in the content information managed by the management section when the file path of the content has been changed, during a period in which the file path and the device specification information of the target content each included in the content list information are different from the current file path and current device specification information, when receiving the acquisition request of the target content from the application execution section by specifying the content identifier of the target content, and the device specification information and the file path of the target content each included in the content list information, the address generation section generates the acquisition address by combining the content identifier of the target content with the current file path and a current communication identifier each managed by the management section, and notifies the application execution section of the acquisition address, and the application execution section acquires the target content from the device by specifying the acquisition address notified by the address generation section.

* * * * *